US012005936B2

(12) United States Patent
Hart et al.

(10) Patent No.: US 12,005,936 B2
(45) Date of Patent: Jun. 11, 2024

(54) RAIL VEHICLE WITH HUMAN AND/OR ELECTRIC POWER

(71) Applicant: Mendocino Railway, Fort Bragg, CA (US)

(72) Inventors: Michael Glen Hart, Davis, CA (US); James Adamski, Fort Bragg, CA (US); Tyler Kise Allen, Fort Bragg, CA (US); Kennan Hambleton Beard, III, Modesto, CA (US); Steven Anthony Goodwin, Davis, CA (US); Vicki Hwang Hart, Davis, CA (US); Christian Giovanni Natareno, Fort Bragg, CA (US); Oscar-Anthony Curtis Natareno, Fort Bragg, CA (US); Robert Jason Pinoli, Philo, CA (US)

(73) Assignee: Mendocino Railway, Fort Bragg, CA (US)

( * ) Notice: Subject to any disclaimer, the term of this patent is extended or adjusted under 35 U.S.C. 154(b) by 227 days.

(21) Appl. No.: 17/199,223

(22) Filed: Mar. 11, 2021

(65) Prior Publication Data

US 2021/0284203 A1    Sep. 16, 2021

Related U.S. Application Data

(60) Provisional application No. 62/989,254, filed on Mar. 13, 2020.

(51) Int. Cl.
*B61D 15/10*    (2006.01)
*B61D 15/12*    (2006.01)
(Continued)

(52) U.S. Cl.
CPC ............. *B61D 15/10* (2013.01); *B61D 15/12* (2013.01); *B61D 49/00* (2013.01); *B62K 3/005* (2013.01);
(Continued)

(58) Field of Classification Search
CPC ........ B61D 15/08; B61D 15/10; B61D 15/12; B61D 49/00; B62K 3/005; B62K 7/00;
(Continued)

(56) References Cited

U.S. PATENT DOCUMENTS 2,502,889 A * 4/1950 Ruppe .................... B61H 11/02
188/125
5,330,217 A * 7/1994 McCarthy ............ B62K 27/003
280/47.11
(Continued)

FOREIGN PATENT DOCUMENTS

DE        20011704 U1 * 10/2000 ............. B61D 15/08
DE   202005002880 U1 *  6/2005 ............. B61D 15/10
(Continued)

OTHER PUBLICATIONS

Travels by Trike, Truck'N Trailer, Skunk Train Rail Bikes in Ft Bragg Cycling With Friends. YouTube. Nov. 30, 2019 (Nov. 30, 2019) [retrieved on Jul. 4, 2021].
(Continued)

*Primary Examiner* — Zachary L Kuhfuss
*Assistant Examiner* — Cheng Lin
(74) *Attorney, Agent, or Firm* — Heisler & Associates

(57) ABSTRACT

A railway vehicle includes two axles with wheels at ends thereof, and a frame rotatably supporting the axles. A seat is carried on the frame adjacent to pedals which are coupled to at least one of the wheels, typically through one of the axles. A battery and electric motor are configured to also supply power. The electric motor is adjustable to deliver controllable amounts of electric power to drive the wheels, separate from or in addition to pedal power delivered to the wheels. A trailer accessory can be towed on the rails by the vehicle. A turntable is provided with rail segments thereon, rotatable relative to a base, and with ramps on at least one end of each
(Continued)

rail segment alignable with left and right rails of the railway. Vehicles can roll up the ramps onto the rail segments and then pivot 180° for operation in a reverse direction.

11 Claims, 21 Drawing Sheets

(51) Int. Cl.
| | |
|---|---|
| *B61D 49/00* | (2006.01) |
| *B62K 3/00* | (2006.01) |
| *B62K 7/04* | (2006.01) |
| *B62K 27/00* | (2006.01) |
| *B62M 6/40* | (2010.01) |

(52) U.S. Cl.
CPC .............. *B62K 7/04* (2013.01); *B62K 27/003* (2013.01); *B62K 2204/00* (2013.01); *B62M 6/40* (2013.01)

(58) Field of Classification Search
CPC ........ B62K 7/02; B62K 7/04; B62K 2204/00; B62K 27/00; B62K 27/003; B62M 6/40; A63G 25/00
See application file for complete search history.

(56) References Cited

U.S. PATENT DOCUMENTS

| | | | | |
|---|---|---|---|---|
| 7,108,097 | B1 * | 9/2006 | Bolton | B62M 6/55 280/288.1 |
| 7,861,658 | B2 | 1/2011 | Lee | |
| 10,315,726 | B2 * | 6/2019 | Jackson | B62M 6/55 |
| 2008/0129007 | A1 * | 6/2008 | Lee | B62K 5/00 280/242.1 |
| 2009/0038502 | A1 | 2/2009 | Lee | |
| 2012/0247854 | A1 | 10/2012 | Kyoden | |
| 2014/0142868 | A1 * | 5/2014 | Bidaud | G01N 21/8803 702/34 |
| 2017/0073039 | A1 | 3/2017 | Jackson | |

FOREIGN PATENT DOCUMENTS

| | | | | |
|---|---|---|---|---|
| DE | 202013004630 | U1 * | 11/2013 | ............ B62K 27/003 |
| FR | 2939092 | A1 * | 6/2010 | ......... B60B 17/0003 |
| KR | 100839086 | B1 | 6/2008 | |
| KR | 100870580 | B1 | 12/2008 | |
| WO | WO-2017030230 | A1 * | 2/2017 | ............. A63G 21/20 |

OTHER PUBLICATIONS

Retrieved from the internet:<URL:https://www.youtube.com/watch?v=10-nfcbo7Vc> entire video.

California Through My Lens. Riding the Skunk Train Railbikes in Fort Bragg. YouTube. Aug. 24, 2018 (Aug. 24, 2018) [retrieved on Jul. 5, 2021].

Retrieved from the internet:<URL:https://www.youtube.com/watch?v=m0jvErJnSzc> entire video.

Taking a Ride with the Catskills Rail Explorers by NY Foodie Family. http://nyfoodiefamily.com/2019/10/16/taking-a-ride-with-the-catskills-rail-explorers/ (Oct. 16, 2019).

Violet Snow, Explore the Catskills on a Rail Bike https://hudsonvalleyone.com/2018/04/24/explore-the-catskills-on-a-rail-bike/ (Jun. 14, 2018).

HV1 Rail Explorers Offer Pedal Powered Catskills Tours by HV1 Staff, Hudson Valley One, https://hundsonvalleyone.com/2019/09/12/rail-explorers-offer-pedal-powered-catskills-tours/ (Sep. 12, 2019).

Front Row Dave, Rail Explorers Catskills Mountains Phoenica, NY, Opening Day. YouTube youtube.com/watch?v=TjLclSqXEjM (May 26, 2018).

Michael Hodgson, Riding the Rails on a Rail Bike with Revolution Rail. Hi Travel Tales. https://hitraveltales.com/rail-biking-riding-the-rails-on-a-rail-bike-with-revolution-rail/ (Jul. 18, 2019).

Rail Biking With Revolution Rail. YouTube https://www.youtube.com/watch?v=uVH4EIjETKE (Jul. 17, 2019).

Revolution Rail Scenic Bike Tour in the Adirondack Mountains. Our Life v3 YouTube Video https://www.youtube.com/watch?v=6psl6t3YymQ (Oct. 27, 2017 and Oct. 31, 2017).

Railbikes Route Review Revolution Rail Co North Creek, NY. tumblr.com, https://railbikes.tumblr.com/post/183166452007/route-review-revolution-rail-co-in-north-creek (2017).

Ken Picard, Pedaling the Rail Trail in Saranac Lake. Seven Days, Arts & Life Outdoors & Recreation (Jul. 27, 2016).

That Took A Turn!; Vance Creek Railriders; Nov. 27, 2018; www.youtube.com/watch?v=h7Vde_wBifw; 10 pages.

Trend Spotter: Rail Bikes; HeritageRail Alliance; Jan. 9, 2017; https://heritagerail.org/2017/01/trend-spotter-rail-bikes/; 10 pages.

Adirondack Startup Combines Bicycle, Train for New Rail Tour Business; Oct. 8, 2015; https://www.youtube.com/watch?v=fCxhtRt6-LE; 7 pages.

Pedal-powered rail rides explore Oregon Coast (statesmanjournal.com); statesman journal; Jun. 15, 2016; Pedal-powered rail rides explore Oregon Coast (statesmanjournal.com); 3 pages.

Explore the Catskills on a rail bike; Hudson Valley One; Violet Snow; Jun. 14, 2018; https://hudsonvalleyone.com/2018/04/24/explore-the-catskills-on-a-rail-bike/; 10 pages.

Rail Explorers makes tracks into Philly region with rail-bike excursions; Apr. 30, 2016; https://www.inquirer.com/philly/entertainment/20160501_Rail_Explorers_makes_tracks_into_Philly_region_with_rail-bike_excursions.html; 9 pages.

Pedal on Train Tracks With Rail Explorers USA; TravelAge West; Samantha Davis-Friedman; Nov. 26, 2019; https://www.travelagewest.com/Travel/Family-Travel/Pedal-on-Train-Tracks-with-Rail-Explorers-USA; 2 pages.

Do-It-Yourself Transit Guide; Kevin Bracken; Apr. 27, 2008; https://torontoist.com/2008/04/doityourself_tr/; 3 pages.

Ride the rails with pedal power—Review of Joseph Branch Railriders, Joseph, OR; Tripadvisor; Sep. 14, 2014; https://www.tripadvisor.com/ShowUserReviews-g51926-d6875355-r228192483-Joseph_Branch_Railriders-Joseph_Oregon.html; 3 pages.

RailBikes Come to the Redwoods California's North Coast; Aug. 13, 2018; https://northofordinaryca.com/blog/railbikes-come-to-the-redwoods/; 7 pages.

Rail Explorers offer pedal-powered Catskills tours; Hudson Valley One; HV1 Staff; Sep. 12, 2019; https://hudsonvalleyone.com/2019/09/12/rail-explorers-offer-pedal-powered-catskills-tours/; 8 pages.

Rail Explorers offer petal-powered Catskills tours; Hudson Valley One; HV1 Staff; Sep. 12, 2019; https://hudsonvalleyone.com/2019/09/12/rail-explorers-offer-pedal-powered-catskills-tours/; 8 pages.

Ride Southern Nevada's historic railroad in a new way—Video; Las Vegas Review-Journal; Jan. 24, 2019; https://www.reviewjournal.com/local/local-nevada/ride-southern-nevadas-historic-railroad-in-a-new-way-video-1580941/; 4 pages.

Pedaling The Rails From Enterprise To Joseph, Oregon; OPB; Kelsey Wallace; Jun. 30, 2017; https://www.opb.org/artsandlife/series/summer-series/oregon-enterprise-joseph-rail-trail/; 4 pages.

Pedal on Train Tracks With Rail Explorers USA; TravelAge West; Samantha Davis-Friedman; Nov. 26, 2016; https://www.travelagewest.com/Travel/Family-Travel/Pedal-on-Train-Tracks-with-Rail-Explorers-USA; 2 pages.

Kevin Kinsella, NPOV Lions Railriders Born to be Wild, 1 page 2019, Youtube.com, Web page https://youtu.be/.

Gayle Pollock, How do the tours work, 1 page, 2018, lionsrailriders.com, Web page https://lionsrailriders.com/faqs/.

Michelle Allen, Lions Rail Riders Box Canyon Turn Around, 1 page, Aug. 1, 2018, Youtube.com, Web page https://www.youtube.com/.

Joseph Branch Railriders—What a ride, 7 pages, Jul. 2014, roadslesstraveled.us, Web page https://roadslesstraveled.us/joseph-branch-railriders-oregon-railroad-bike-ride/.

Sean Flynn, Rail Cycling, 2 pages, Jan. 25, 2017, Bikeforums.net, Web page https://www.bikeforums.net/general-cycling-discussion/1095805-rail-cycling.html.

(56) References Cited

OTHER PUBLICATIONS

Andrew Silva, Riding the Rails in North Creek at RevRail Co, 1 page, Jul. 28, 2017, Youtube.com, Web page https://www.youtube.com/watch?v=aEQXHvbZVY0.

Violet Snow, Explore the Catskills on a rail bike, 3 pages, Apr. 24, 2018, Hudsonvalleyone.com, Web page https://hudsonvalleyone.com/2018/04/24/explore-the-catskills-on-a-rail-bike/.

Michael Hodgson, The best railbike adventure-Find railbikes near me, 7 pages, Jun. 25, 2021, hitraveltales.com, Tips Travel Planning Web page https://hitraveltales.com/category/travel-tips/travel-planning/.

These 4-Wheelers Ride The Rails, 2 pages, 2007, Farmshow.com, Archives, 2007 vol. 31 Issue 5 Web page https://www.farmshow.com/a_issue.php?volume=31&issue=5.

Kevin Braken, Do-It-Yourself Transit Guide, 3 pages, Apr. 28, 2008, Torontoist.com, Web page https://torontoist.com/2008/04/doityourself_tr/.

Abigail Curtis, Rail cycles offer scenic exercise, 2 pages, Jul. 7, 2010, BangorDailyNews.com, Web page https://bangordailynews.com/2010/07/07/news/midcoast/rail-cycles-offer-scenic-exercise/.

\* cited by examiner

RAIL VEHICLE WITH HUMAN AND/OR ELECTRIC POWER

CROSS-REFERENCE TO RELATED APPLICATIONS

This application claims benefit under Title 35. United States Code § 119(e) of U.S. Provisional Application No. 62/989,254 filed on Mar. 13, 2020.

FIELD OF THE INVENTION

The following invention relates to vehicles which ride upon two parallel rails, such as railroad rails. More particularly, this invention relates to vehicles which have motive power from human pedal cranking power and/or battery power through an electric motor.

BACKGROUND OF THE INVENTION

Bicycles and other pedal powered vehicles come in a variety of configurations. Typically such pedal powered vehicles are configured for operation on roads or trails. While most often they have two wheels including one front wheel and one rearward wheel, some pedal powered vehicles have other numbers of wheels, such as unicycles and tricycles. Typically bicycles and other pedal powered vehicles include some form of steering mechanism which allows for steering of the vehicle in a desired direction. While most pedal powered vehicles are for a single person, some bicycles and other pedal powered vehicles are for multiple riders, typically with each rider having an opportunity to input pedal power, such as with a tandem bicycle. Some pedal powered vehicles are provided for operation on unique surfaces, such as on a surface of a waterway, and with a floating hull and propeller driven by the pedals, rather than with wheels.

Pedal powered vehicles provide both practical and mental benefits, with transportation being a primary practical benefit, but also with useful exercise and physical fitness being maintained with pedal powered vehicles. Cyclists often ride for enjoyment, experiencing the pleasure of relatively quiet and often relatively high speed movement, enjoying passing through an interesting environment and being transported from an origin to a destination. One pathway which has had limited (if any) access for cyclists in the prior art has been railways. Railways are generally the exclusive domain of trains, including both locomotives and railcars carried by the locomotives. Some railways pass through highly attractive settings and lead to or through locations which are desirable for individuals to visit. Many railroads have shut down. The rails are still in place and could be repurposed. Thus, the potential exists for cyclists to enjoy riding a pedal powered vehicle upon a railway. However, numerous hurdles are presented when considering the possibility of cycling upon a railway Amongst these hurdles faced by cyclists who wish to ride a pedal powered vehicle upon a railway, the following issues are identified, by way of example. Railways are typically operated with trains thereon, and pedal powered vehicles are not particularly compatible with trains. They typically travel at lower speeds than trains. Railways do not easily allow for one vehicle to pass another. The significant size difference presents the possibility for collisions which could involve significant forces and potential for injury.

Railways have various junctions therein and elements such as grade crossings, trestles, signaling systems, and other apparatuses which need to be compatible with any vehicles traveling over the railway. Furthermore, a variety of regulations set forth by government agencies, and operating rules of railway managers must be complied with to ensure safe and appropriate function of any vehicles upon the railway. While a single pedal powered vehicle might operate somewhat successfully on a railway, when multiple pedal powered vehicles are operating on the railway, they have significant opportunity for disrupting the operation of the other pedal powered vehicles, either because they wish to travel in different directions on the same railway, or travel at different speeds in the same direction, with a faster pedal powered vehicle behind the slower pedal powered vehicle, and with no way to pass. Railroads also often operate on a slight grade, one that is too much for most people to pedal up as they would quickly become exhausted and be forced to stop. Even a 3% grade would be too much for most people to pedal up or turn an enjoyable trip into an unpleasant burden.

A further hurdle is the general incompatibility of existing cycling machines with railways. Railways do not require steering, yet most pedal powered vehicles include steering mechanisms. Railways require railroad type wheels to ensure that the vehicle stays upon the rails, causing any such vehicle to have a width approximately as wide (if not wider) than the railroad, which is typically significantly wider than most pedal powered vehicles. Accordingly, and in view of the various hurdles associated with effectively providing a pedal powered vehicle for operation on railway, a need exists for both an effective railway pedal powered vehicle, and a system and method for operation of multiple railway pedal powered vehicles on a railway, so that compatible enjoyment of individuals on multiple different pedal powered railway vehicles can be accommodated. Any such vehicles and systems would benefit from also having accessories similar to those of bicycles, such as trailers which can be towed on the railway.

Furthermore, many railways extend between an origin and a destination, and do not include a loop (or other track and figuration) at either the origin or the destinations to conveniently reverse the vehicles to return in the direction from which they came. Thus, a need exists for a mechanism which can turn a vehicle from going in a first direction to go in a second opposite direction. Such vehicle turning equipment also benefits from being at least partially movable, so that it can be moved into and out of position and leave the tracks clear when out of position.

SUMMARY OF THE INVENTION

With this invention, a pedal powered and/or electric power railway vehicle is provided which is configured for operation upon a railway. Furthermore, a system and method of this invention is disclosed where multiple such pedal and/or electric powered railway vehicles can operate together in a highly compatible fashion for both enjoyment and to maintain safe operation for individuals riding upon the separate pedal powered vehicles. It is contemplated that the method and system of this invention might be utilized with the railway vehicle specifically disclosed, as well as with other rail vehicles not disclosed herein. Furthermore, it is contemplated that railway vehicles such as those disclosed herein could be utilized with other methods and systems, rather than merely the particular system and method disclosed herein. In one embodiment, at least some of the time no power is needed, and the vehicle can be powered by gravity, traveling along rails from a higher to a lower elevation.

The pedal powered and/or electric powered railway vehicle, in the embodiment disclosed, includes a frame, and generally with this frame carried upon wheels below the frame and with at least one seat (and typically two seats) carried above the frame. In one embodiment, the frame includes horizontal parallel frame rails extending from a rear of the vehicle to a front of the vehicle. These define a pair of first frame members (also referred to as long members). A second pair of frame members are oriented as lateral frame members extending perpendicular to the pair of first frame members, and with one of the lateral frame members adjacent to two forward wheels and another of the lateral frame members adjacent to two rearward wheels.

The front wheels can be joined together by an axle therebetween and the rear wheels can be mounted to an axle therebetween. These axles can be rotatably supported by bearings which extended down from the lateral frame members (or other frame members particularly provided to support the axles adjacent thereto). The wheels are configured as railroad type wheels, generally including an inside flange oriented within a vertical plane and a cylindrical wheel surface which can contact with an upper surface of a rail of a railway. Spacing between the wheels is carefully selected to match a spacing between rails matching the gauge for the railway upon which the pedal powered railway vehicle is to be operated.

While railway wheels are often very heavy, for the pedal powered railway vehicle, the wheels could be formed of medium or lightweight polymeric hydrocarbon or composite materials, so that the vehicle is not particularly heavy, especially when the frame members are hollow tubular structures (with either a square or circular (or other) cross-section) to minimize weight and optimize strength. If desired, bumpers could be attached to front and rear portions of the frame, such as to minimize potential for damage to the vehicles or injury to riders if two vehicles impact each other. By making the vehicle light enough for one or two people to lift, the vehicle can be more easily turned around for travel in an opposite direction (or a turntable, such as that disclosed herein, can be used).

The seats are preferably mounted above the first frame members, such as with one seat directly above each of the first frame members. The seats could alternatively be suspended in different positions either directly or indirectly from either the first frame members or the second frame members. Preferably two seats are provided side-by-side, so that the pedal powered railway vehicle can be enjoyed by a couple, if desired. In other embodiments, further seats could be provided, such as two front seats and two rear seats. Pedals for front and rear seats can be provided. As another option, at least one of the seats can be pedal free and instead have foot rests, such as when used by non-pedaling occupants, such as disabled individuals, children or the elderly. As a further embodiment, a single bench seat could be provided or other multi-person seat could be provided. Child seats can attach to or replace one of the seats as well. A cargo basket area or other auxiliary platform could be provided to stow gear and/or to provide a location for pets to ride along. One location for such a basket or platform is directly behind one or more of the seats. Another optional location, size and configuration for such a platform would be in front of the seats, so that riders on the seats could actively view the platform and monitor pets, gear or children (with appropriate child seats secured thereto) located upon the platform. A trailer can also be utilized for such purposes, as described in detail below.

The vehicle in one embodiment includes a removable or collapsible rain/weather cover. Such a cover could be of canvas (such as like a convertible top for an automobile) or could be made of metal or of clear material (glass or plastic), or made of various materials combined together. The cover would be deployable when needed to protect riders from the weather (rain, wind, cold, bright sunlight, flying pests, etc.). As an option, such a cover could include solar photovoltaic panels to power the vehicle and/or charge the battery on the vehicle. Furthermore, seats of the vehicle could be heated (or cooled), such as powered by the onboard battery, to enhance rider comfort.

In one embodiment, a trailer is provided as well with a frame and wheels and a load carrying bed. The trailer would have some form of hitch to allow connection and towing by a vehicle. Such a trailer could be sized and optionally optimized to carry particular loads, such as broken down vehicles, camping gear, luggage, extra passengers, extra batteries, rain canopies, handicapped riders, food, pets, companion animals, seeing eye dogs, etc., as well as and other items or equipment.

Typically, some form of seatbelt or harness would be provided to keep the riders upon the seat(s) during operation of the vehicle. A floor pan can optionally be provided beneath the seats, so that legs of an individual cannot reach the ground, such as while the vehicle is moving. As an alternative, the seats could be high enough to prevent legs of the riders from reaching ground between the rails. As a further alternative, riders can keep their feet on the pedals at all times, and the pedals could optionally include baskets, brackets, or other devices to secure feet of the rider to the pedals.

Preferably, the pedals are mounted in a manner which allows them to rotate, suspended from the first frame members, and with a set of pedals for each rider in front of each seat. This orientation can generally match that of a typical recumbent bicycle. Handlebars, such as those typically provided with a recumbent bicycle, could optionally be provided, so that a rider can grip the handlebars for stability when aggressively pumping the pedals, or otherwise to allow a rider to "hold on" while the vehicle is moving.

The pedals are coupled to a sprocket which carries a chain forward to a second sprocket mounted to a front axle of the vehicle. Alternatively, the chain could extend to a sprocket on the rear axle, so the rotation of the pedals cause either the front axle or the rear axle (or both) to rotate. In one embodiment, pedals are provided in front of each of the seats, and each seat has associated pedals routed to a common axle, so the rotation of the pedals causes that axle to rotate. In one embodiment, a free wheel device is associated with either the pedals and/or the sprocket adjacent to the pedals, or between the axle and the sprocket on the axle, so that the pedals can stop rotating briefly, and will not be driven by further rotation of the axle and the vehicle. Thus, a rider can stop pedaling and the vehicle can be allowed to coast. One rider can pedal while the other rests and "coasts" without pedals rotating, or the other can pedal while the first rider coasts, or both riders can coast together or both riders can pedal together. If desired, gears could be provided to adjust a gear ratio between the pedals and rotation of the associated axle.

In one embodiment of this invention, a battery and electric motor are also provided, with an electric motor coupled to one of the axles. As an example, an output shaft of the electric motor can have a sprocket thereon and a chain can run from this electric motor sprocket to an axle sprocket, so that the electric motor chain can drive one of the axles of the vehicle. In another embodiment, the electric motor feeds power to a common chain that is coupled to pedals, to provide electric power to assist efforts of the user, or can be used without user pedaling. As one option, the axle driven by the electric motor is the axle which is not driven by the pedals of the pedal powered railway vehicle. In this way, operation of the electric drive motor does not need to be integrated into the pedals and associated sprockets and chains which are driven by the riders on the vehicle. As an alternative, the electric motor could be coupled to one (or both) of the pedals/sprocket/hub subsystems, either directly or indirectly, such as by using a drive train from an electric bicycle, or with other equipment which integrates pedals and electric motors together.

The electric motor would typically have a controller, such as a throttle control, which one (or both) of the riders would utilize when a boost of power and additional speed is desired, without requiring harder pedaling action. The batteries could be recharged in place, or be removable for recharging separate from the vehicle, or potentially even being replaced when depleted. Preferably, such a throttle control allows for variable output from the electric motor, so that an operator can select a speed desired for the electric motor, and to most beneficially allow the riders to still input pedal power complementary to power provided by the electric motor, if desired.

The vehicle preferably includes at least one brake, and optionally separate brakes which can be accessed by each of the individuals. These brakes could include a friction brake pressing against a brake disk mounted to an axle, or pressing directly against at least one of the wheels. A brake system can include a parking/emergency brake separate from (or common with) a service brake, so that each vehicle has a main braking system and a back-up braking system which can also lock the wheels when not in use. A further brake could be a regenerative brake which slows the vehicle while simultaneously putting energy back into the battery when desired. A still further brake (or control system for the above brake system) cold be tied to the speedometer to engage the brakes to limit the vehicle to a maximum speed.

A system and method of operation of pedal powered railway vehicles is also disclosed herein. While the system could in many ways be adapted for use with a single pedal powered railway vehicle, it is primarily optimized for utilization with a "convoy" of multiple pedal powered railway vehicles operating together, traveling in a common direction and leaving from an origin at near a common starting time, and arriving at a planned destination near a planned destination arrival time. Thus, the journey would be not dissimilar from a journey on a train, in that a preset start time and end time are contemplated and scheduled for the journey. A route would also be pre-designated. This route and time would be scheduled much the same as train journeys would be scheduled, so the section of track being used by this convoy of pedal powered railway vehicles would be vacant of trains during this planned operational time for the convoy to pass from the origin to the destination.

In a simple form of the invention, the individual riders would merely know where the origin is and where the destination is, orient their vehicles in a proper orientation, and then ride from the origin to the destination. However, this convoy operation could be optimized in many ways. For safety, and to keep the group together, a front vehicle of the convoy could be ridden by one or more individuals which are authorized to lead the convoy. These individuals might be employees of the railway or employees of a concession which provides this railway riding experience to guests. This lead car might be the same as the other vehicles, or might be outfitted with additional equipment. Such a lead car or other car could also have radio communication to the other vehicles in the convoy to share both interesting information and impart out instructions to the riders as the journey progresses. Two-way radios could be provided as well to allow rider communication back to convoy leaders or other personnel.

For instance, such a lead car might be fitted with a larger battery to allow it to travel faster or to be utilized more extensively without pedaling being required. This lead car might be fitted with a radio to allow for communication with other railway personnel, or other authorized individuals within the convoy. For instance, most preferably a "caboose" car within the convoy is at a rear of the convoy and is also staffed by authorized personnel which would be similarly outfitted as the lead car, to keep the guests generally between the lead car and the caboose and with authorized personnel on the lead car and the caboose. Such lead and/or caboose cars (and optionally all of the cars) could also include lights, especially for operation at night, and to enhance safety (optionally along with reflectors). Such lighting/reflectors could be caused to automatically turn on or enter into a higher state of warning when approaching or entering a grade crossing or other intersection.

The lead car and/or caboose could also be fitted with, enhanced bumpers for pushing of adjacent vehicles if necessary, and potentially also towing apparatus, such as structures which can allow a tow rope to be connected between the lead car and other cars, for towing if necessary, even potentially towing of multiple vehicles with separate tow ropes of different lengths, or for coupling of the lead car to adjacent cars.

When a start time is approaching, guests who wish to ride on vehicles within the convoy would typically be provided with a safety briefing and instructions on how to operate the pedal powered railway vehicles. The vehicles would be set up oriented in a desired direction at the origin, and on the railway to be utilized. Switching equipment would typically be switched in advance to provide the convoy safe passage from the origin to the destination. As an alternative, personnel in the lead car, or other personnel, could handle switching equipment to switch junctions in the track appropriately and to cause the convoy to successfully travel from the origin to the destination.

When the time commences for the convoy to depart, the lead car would start out ahead at a maximum pace. If desired, guests could select a position within the convoy generally matching their fitness levels and desire to quickly travel from the origin to the destination. Vehicles closer to the front could enjoy traveling more quickly than vehicles closer to the rear, without excessive necessity to go slower than desired to avoid bumping into a slower leading vehicle. Authorized personnel in the caboose can ensure that no vehicles become stragglers getting too far behind within the convoy. Authorized personnel can also manage operation of gates at grade crossings for the convoy.

As a further option, battery boost of the vehicles within the convoy could potentially be controlled by authorized personnel in the lead car, the caboose, or elsewhere, so that vehicles in the convoy traveling too slow, can be sped up by authorized personnel somewhat, and to keep the convoy generally closer together, depending on the tightness of the schedule during which the railway segment being utilized is available for passage of the convoy of pedal powered railway vehicles. Furthermore, if desired, braking systems on the individual vehicles could be optionally controllable by authorized personnel, such as on the lead car or the caboose, so that any vehicles traveling too fast can be slowed down somewhat by authorized personnel. Such authorized personnel can also control grade crossing guards, track switching controls and other railway systems for the while convoy. For instance, using Dual Tone Multi Frequency (DTMF) technology.

When the destination is reached, the pedal powered rail cars can be brought to a stop, such as at a destination on a siding off of a main line. While the rail cars could be configured to be reversible, such as by merely orienting the seats on the first set of rails from one side of the pedals to another side of the pedals, or simply swiveling them about a rotatable support if the vehicle is pedal-less, and to allow the entire vehicle to go in the opposite direction, most preferably, the vehicles are sufficiently light that one or two individuals can pick them up, rotate them 180° and set them back on the rails. Other rotating devices, such as a roundhouse or turntable type devices could conceivably be utilized to turn the vehicles around. Typically the vehicles would then make a return trip either with the same guests or with other guests. As an alternative, the track could be a circuit so that it starts at an origin and returns to that same origin. As another alternative, the vehicles could be collected by some other transportation device, such as a truck, and the truck could drive the pedal powered railway vehicles back to the origin for use by other guests or other individuals.

In one embodiment, a scenic railway which is ridden by passengers on a train, could run alternating trains and convoys of pedal powered railway vehicles. Guests could pedal a pedal powered railway vehicle in a first direction, and return on a train if desired (or vice versa). As a further alternative, the railway could be dedicated merely for utilization by pedal powered railway vehicles. Vehicles could also be run individually, such as by private owners on defunct railroads.

In one embodiment, sensors on the vehicle and/or the rails could interact together (or with GPS) to identify when vehicles have progressed to various points along the railway. Such information could be used to keep track of where the fleet of vehicles are located. Also, such location information could trigger the playing of audio information through a sound system on the vehicle. Such information could include details of interest to the riders which are specific to the location, or could be status of trip information, or instructions to avoid (or prepare for) hazards like upcoming bumps or grade crossings.

The vehicle (and/or helmets of riders) can be fitted with video (or still image) cameras to record the experience for the riders. In one embodiment, cameras can be selected and turned on/off or adjusted (e.g. zoom in/zoom out) by the riders so that they can control to some extent the filming that occurs. A video screen (or Bluetooth or other wireless link to a smartphone or smart tablet) can be provided to monitor the filming and give feedback to the riders to optimize the experience.

In one embodiment, a turntable is provided as part of a system and method of this invention to turn around vehicles from going in the first direction to going in a second reverse direction upon the railway. The turntable includes a base with a bearing upon the base. A pair of rail segments are carried upon the bearing, typically through an intervening frame. The bearing includes a ring defining a lower portion and a cap defining an upper portion, with both the ring and cap of the bearing having a circular form of similar diameter. Bearing elements, such as load bearings and alignment bearings are mounted to the ring and allow the cap to freely rotate about a common vertical central access of the ring and, as well as alignment bearings which keep the cap aligned with the ring.

The rail segments have at least one ramp on at least one end thereof, and preferably ramps at each end thereof. These ramps taper down to an upper surface of a left rail and right rail of the railway. A vehicle can be rolled up these ramps and onto the railway segments carried by the frame that is upon the cap forming the upper portion of the bearing. The entire frame and railway segments and can then be rotated 180° until the ramps at the ends of the railway segments are again aligned with the left rail and right rail of the railway. The vehicle can then be rolled off of the railway segments using the ramps. One such turntable can re-orient multiple vehicles within a convoy.

The rail segments, ramps, frame and cap are preferably removable relative to the ring, bearing elements and underlying base. The base, ring and bearing elements can remain in fixed position at a turnaround location between rails of the railway. Removable portions of the turntable can be set aside when not in use, leaving the railway open for passage of various different types of vehicles along the railway. When pedal powered vehicles are to be re-oriented, the upper portion of the turntable can have its cap aligned with the ring and have the rail segments and ramps aligned with the left rail and right rail, for use in re-orienting the vehicles. When the turntable is no longer needed, the upper portion can be removed and stored or placed aside nearby for later use.

OBJECTS OF THE INVENTION

Accordingly, a primary object of the present invention is to provide a vehicle which can carry users upon a railway with movement of the vehicle provided by a combination of human pedal power and electric power from a battery driving an electric motor.

Another object of the present invention is to provide a railway vehicle which combines both human pedal power and electric power through an electric motor via a common drive to at least one axle of the railway vehicle, to provide power for motion from at least one human source, from energy stored within a battery, or from a combination of both.

Another object of the present invention is to provide a railway vehicle which can carry as few as one rider, and at least two riders, with two or more of the riders able to contribute human power through pedals for movement of the vehicle along the railway.

Another object of the present invention is to provide a railway vehicle which locates pedals for powering of the railway vehicle in front of seats, with pedals in front of each seat positioned so that the riders on the seats can use their legs and feet on pedals in front of the seats, and with the users in a recumbent position, easily able to view an environment around the railway, including laterally relative to the railway and above the railway, for enjoyable interaction with a surrounding environment.

Another object of the present invention is to provide a human pedal powered railway vehicle which is sufficiently heavy to have a low derailment risk, and sufficiently light for power solely by human pedal cranking, but which weight of the vehicle to avoid significant derailment risk benefitting from supply of electric power through an electric motor assist, to allow such a heavy vehicle to be driven by a combination of human power and electric power.

Another object of the present invention is to provide a railway vehicle with flexible manual and/or electric power supply for maximizing enjoyment of a vehicle riding experience and facilitating keeping of multiple separate vehicles together in a convoy, even if vehicles have riders with different fitness and skill levels.

Another object to the present invention is to provide a railway trailer which is flexibly and removably attachable to a pedal powered railway vehicle for carrying of additional items along with the vehicle upon the railway.

Another object of the present invention is to provide a method for carrying a group of vehicles in a convoy for an at least partially human pedal powered railway vehicle experience for a group of individuals riding upon multiple different vehicles.

Another object of the present invention is to provide a system for allowing a vehicle to travel at least partially by human pedal power upon a railway from an origin to a destination, and then to be re-oriented for return from the destinations back to the origin along the same railway, with a turntable configured to re-orient the vehicle upon the railway.

Another object of the present invention is to provide a railway vehicle which includes electric power delivered to an electric motor which is controllable to deliver different levels of power to the vehicle at the selection of a user riding on the vehicle, for control of speed of the vehicle and/or control of power required to be inputted by the user through paddle cranking power delivery to the vehicle.

Other further objects of the present invention will become apparent from a careful reading of the included drawing figures, the claims and detailed description of the invention.

DESCRIPTION OF THE PREFERRED EMBODIMENT

Figure 2:
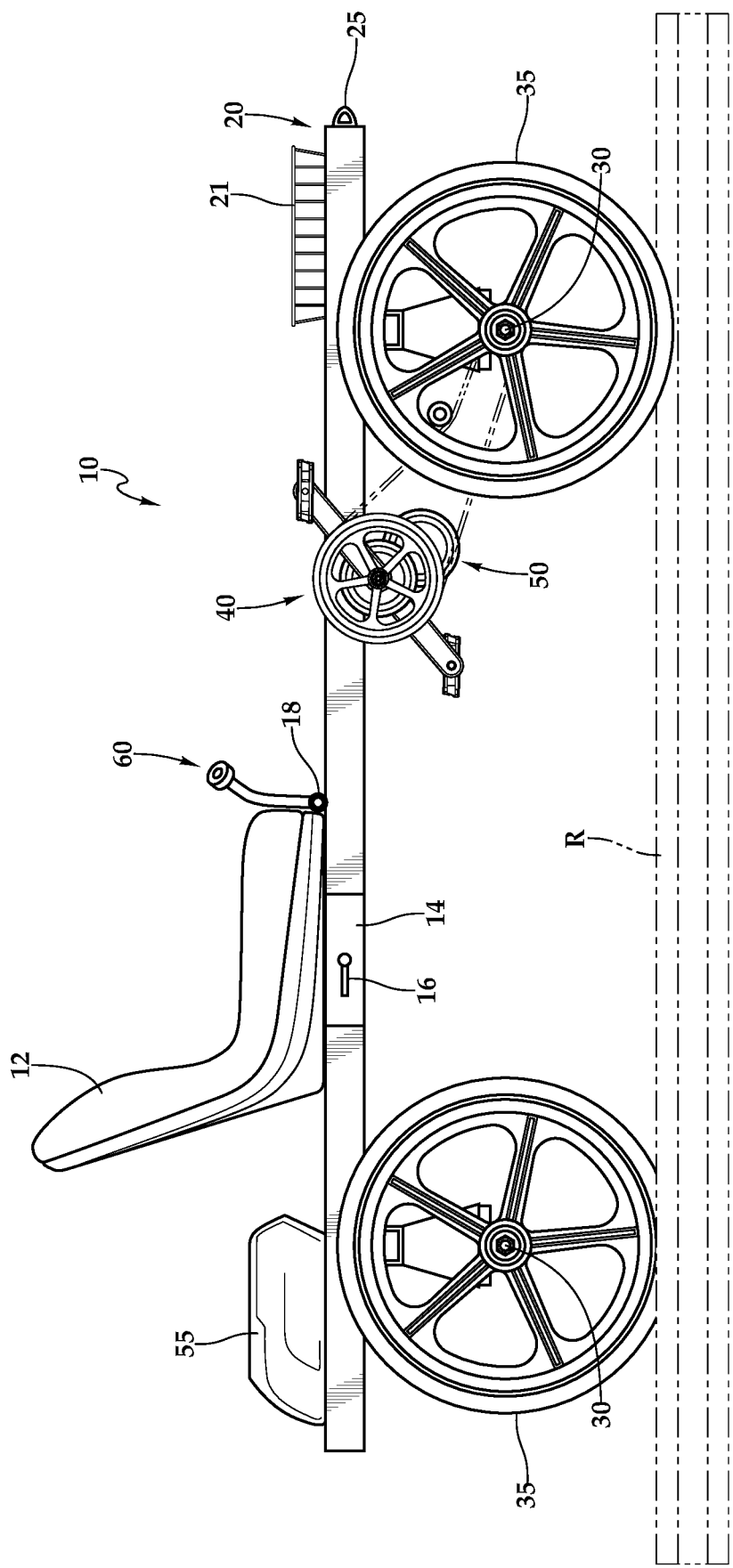
FIG. 2 is a right side elevation view of that which is shown in FIG. 1.
Figure 3:
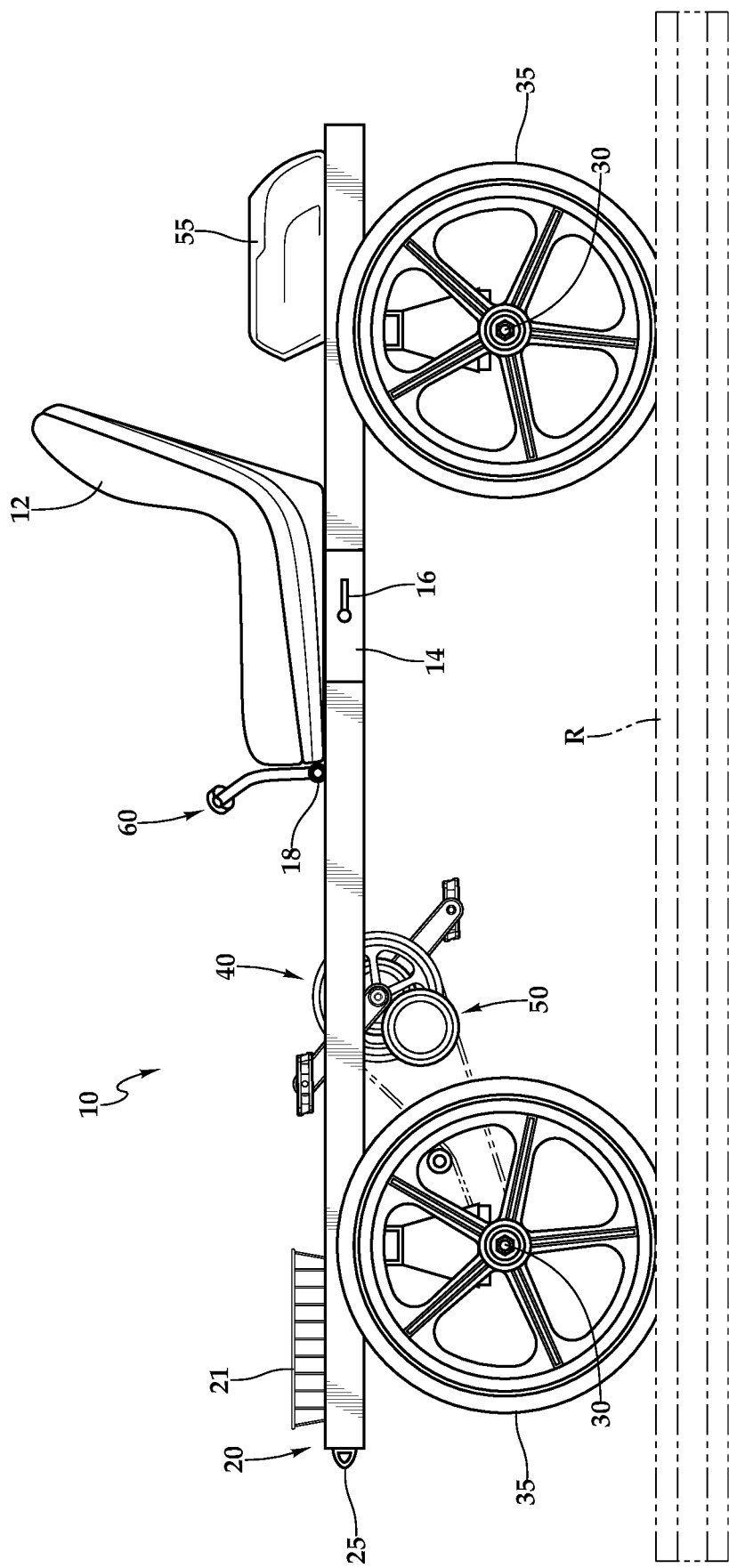
FIG. 3 is a left side elevation view of that which is shown in FIG. 1.
Figure 4:
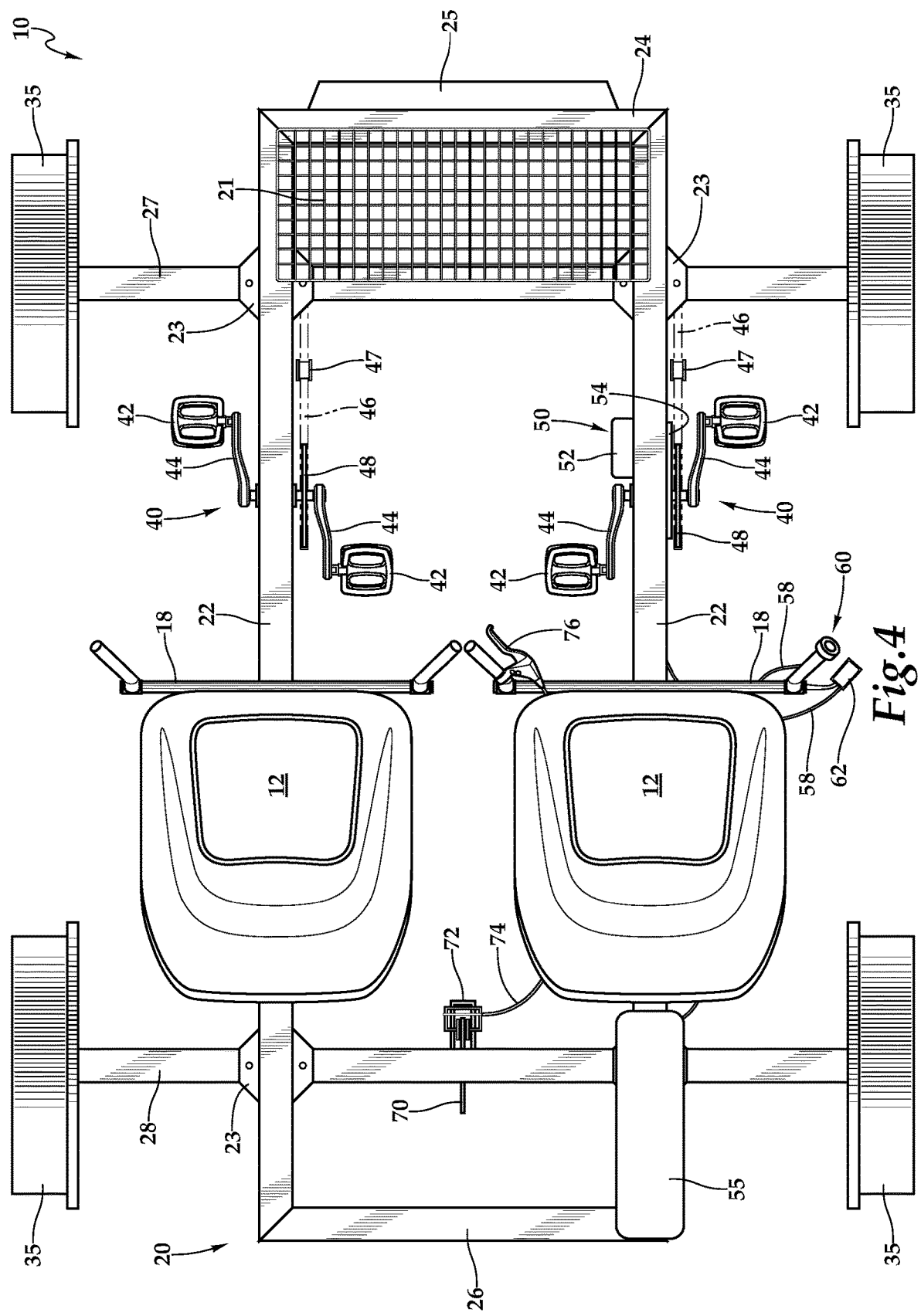
FIG. 4 is a top plan view of that which is shown in FIG. 1.
Figure 5:
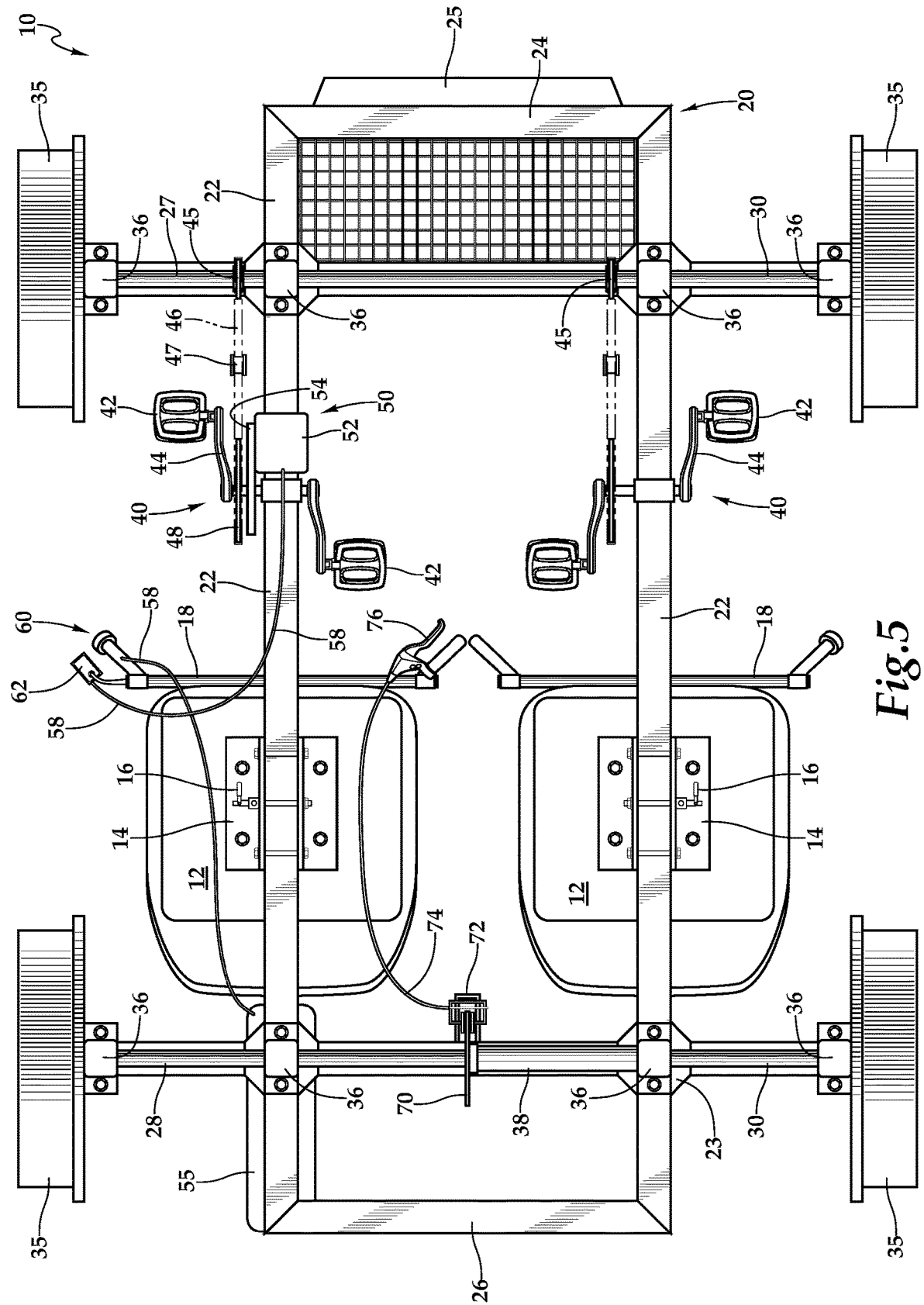
FIG. 5 as a bottom plan view of that which is shown in FIG. 1.
Figure 6:
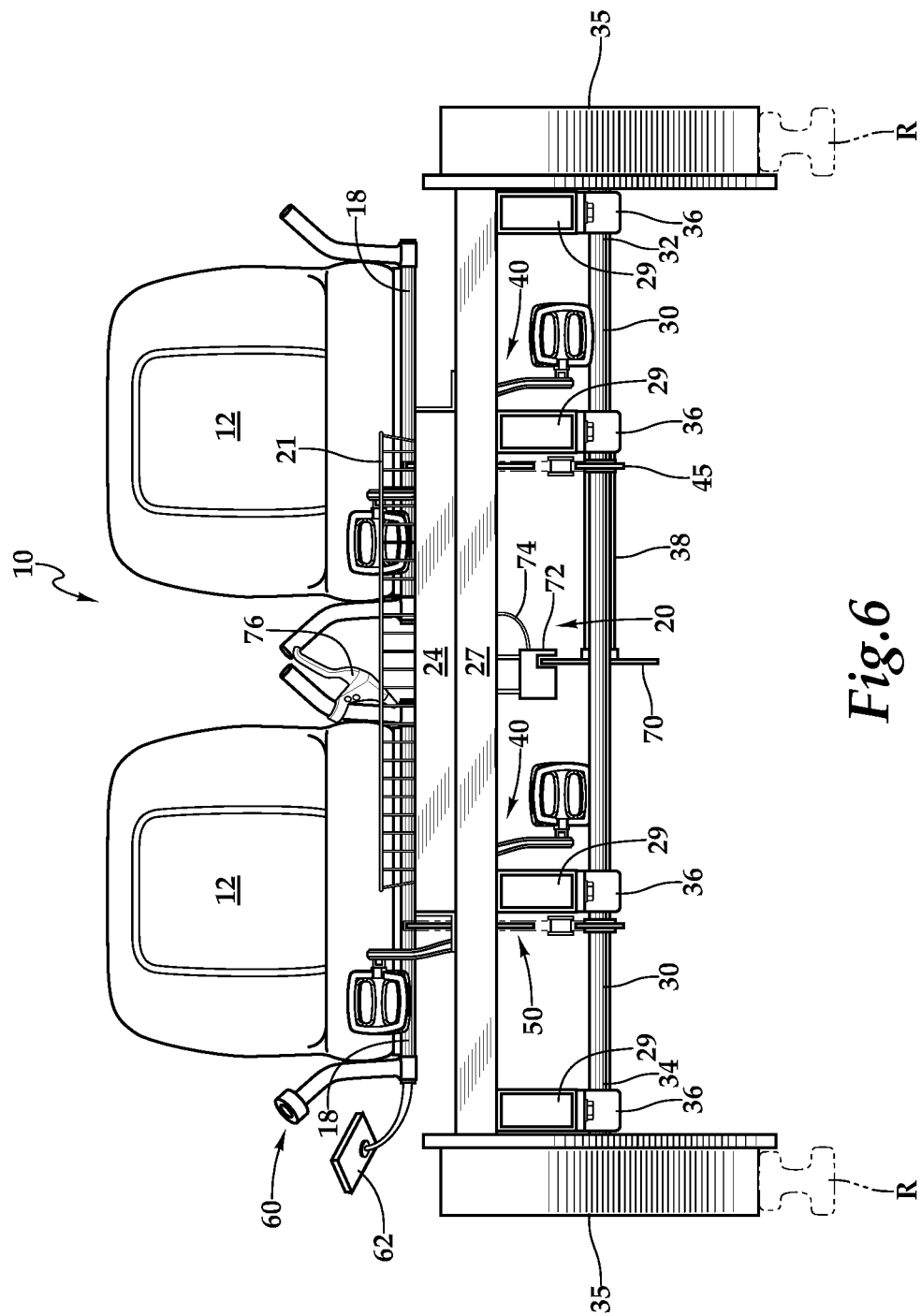
FIG. 6 is a front elevation view of that which is shown in FIG. 1.
Figure 7:
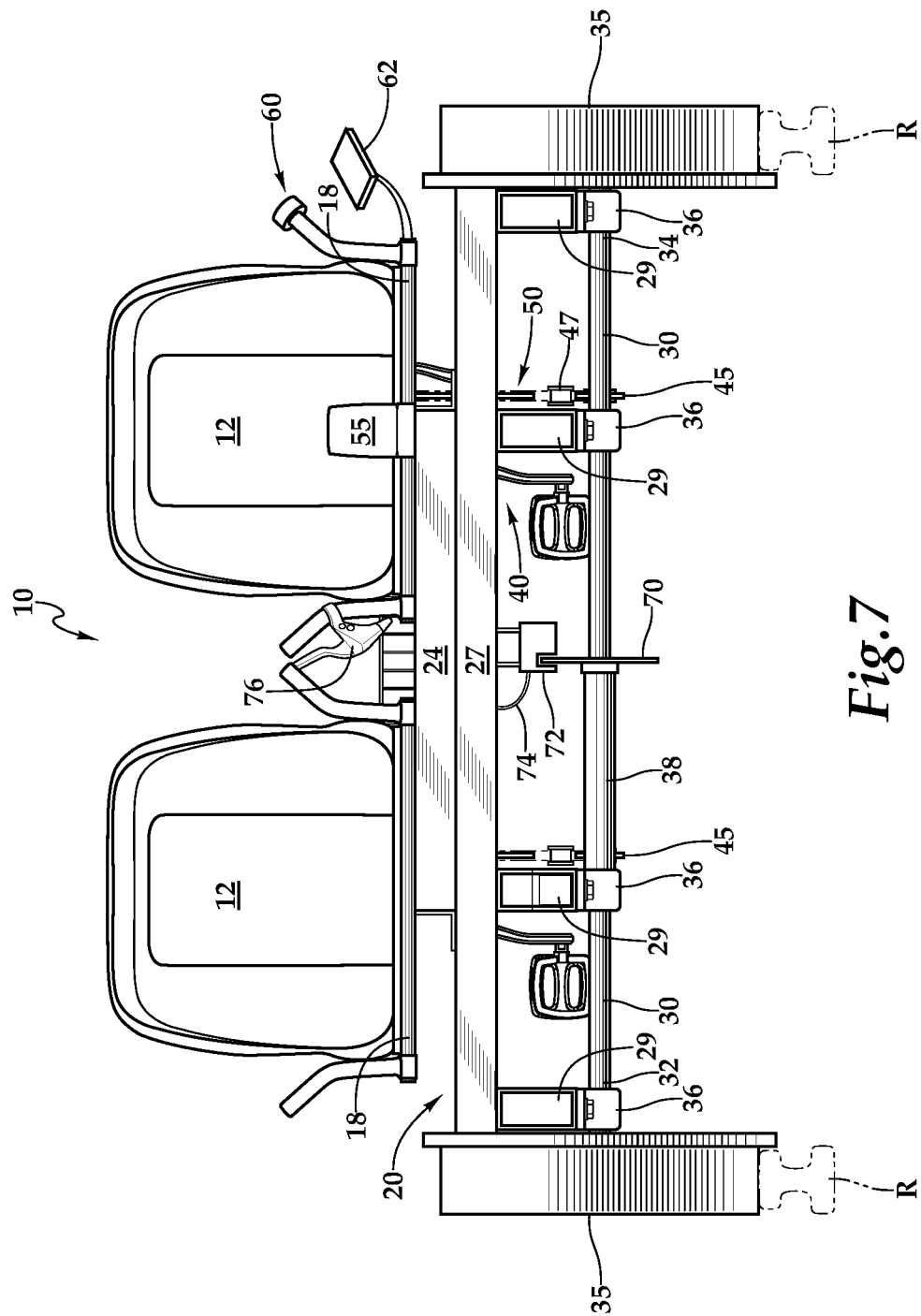
FIG. 7 is a rear elevation view of that which is shown in FIG. 1.
Figure 11:
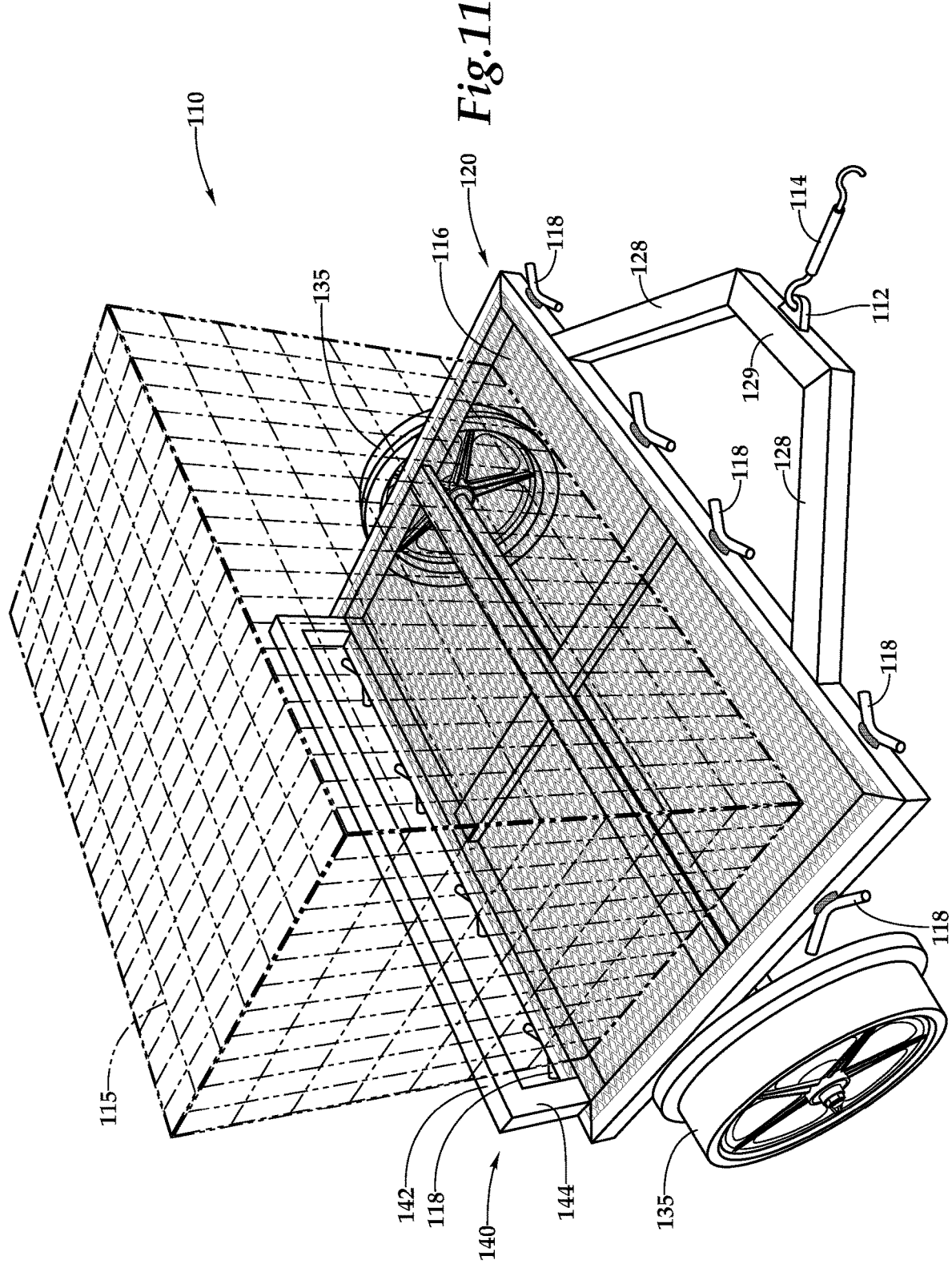
FIG. 11 is a perspective view of a trailer suitable for riding on a railway and carryable by the vehicle of FIG. 1, the trailer shown according to one embodiment thereof with an optional pet cage carried thereon.
Figure 12:
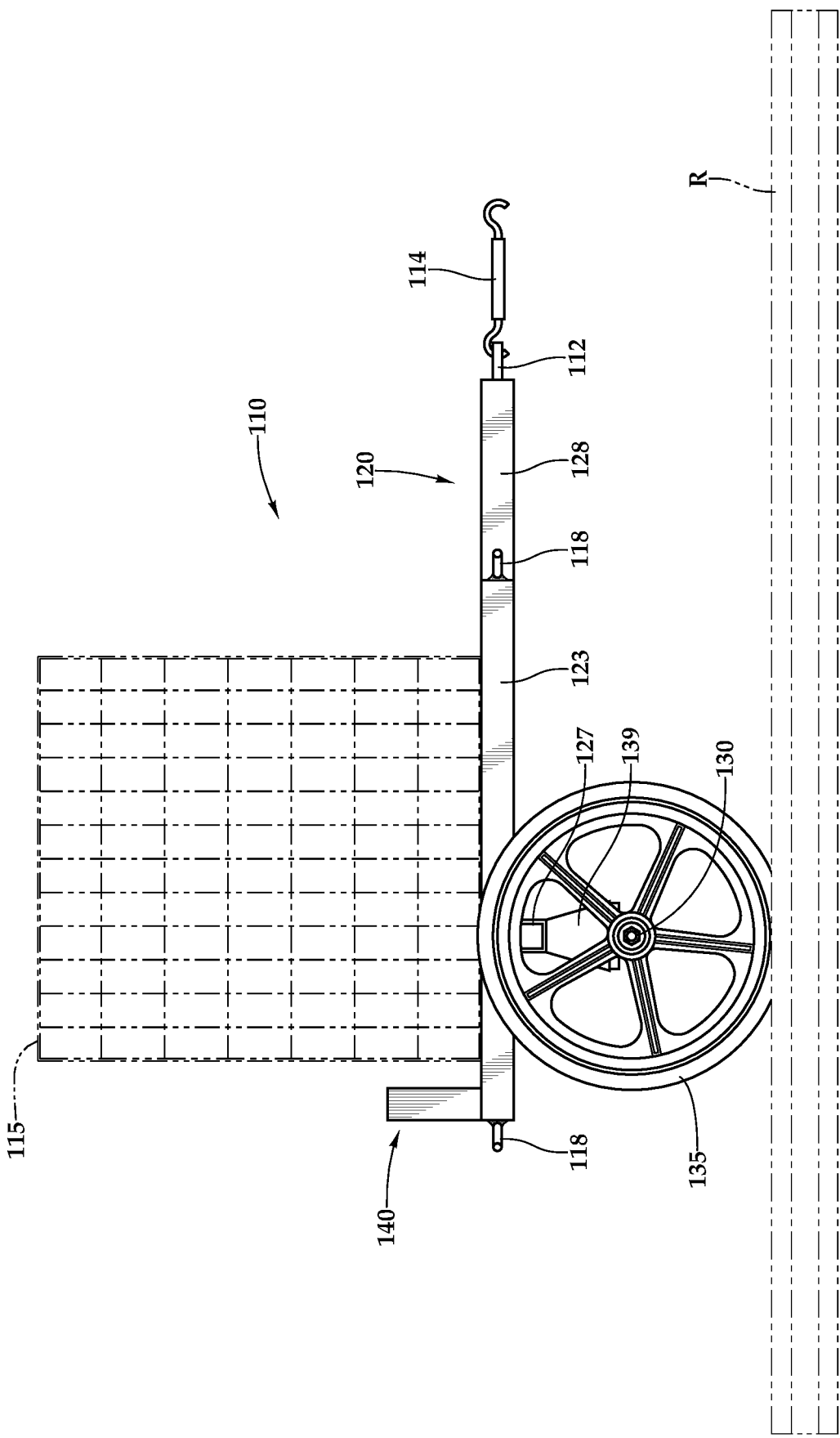
FIG. 12 is a right side elevation view of that which is shown in FIG. 11, with a left side elevation view being a mirror image of this view.
Figure 13:
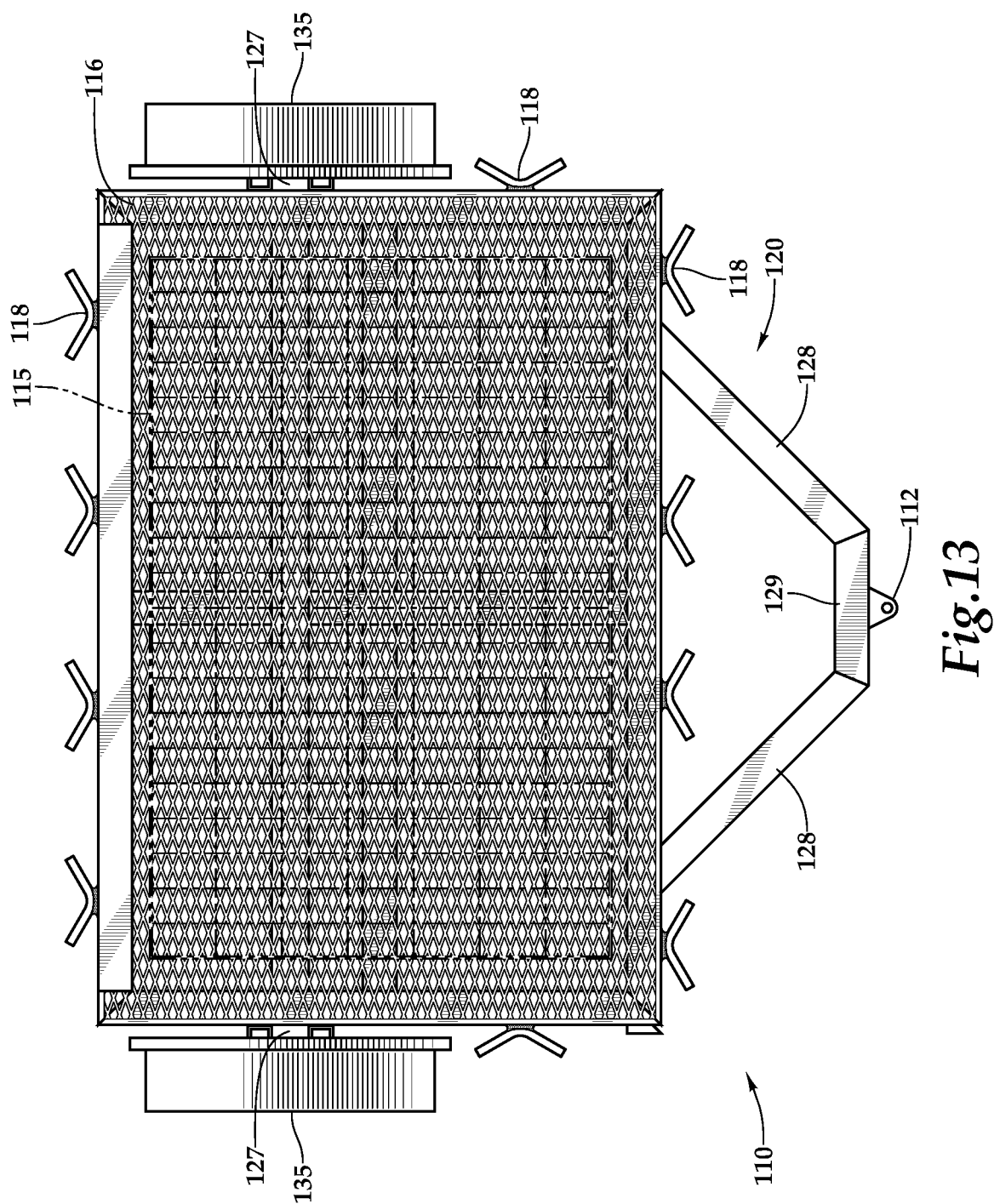
FIG. 13 is a top plan view of that which is shown in FIG. 11.
Figure 14:
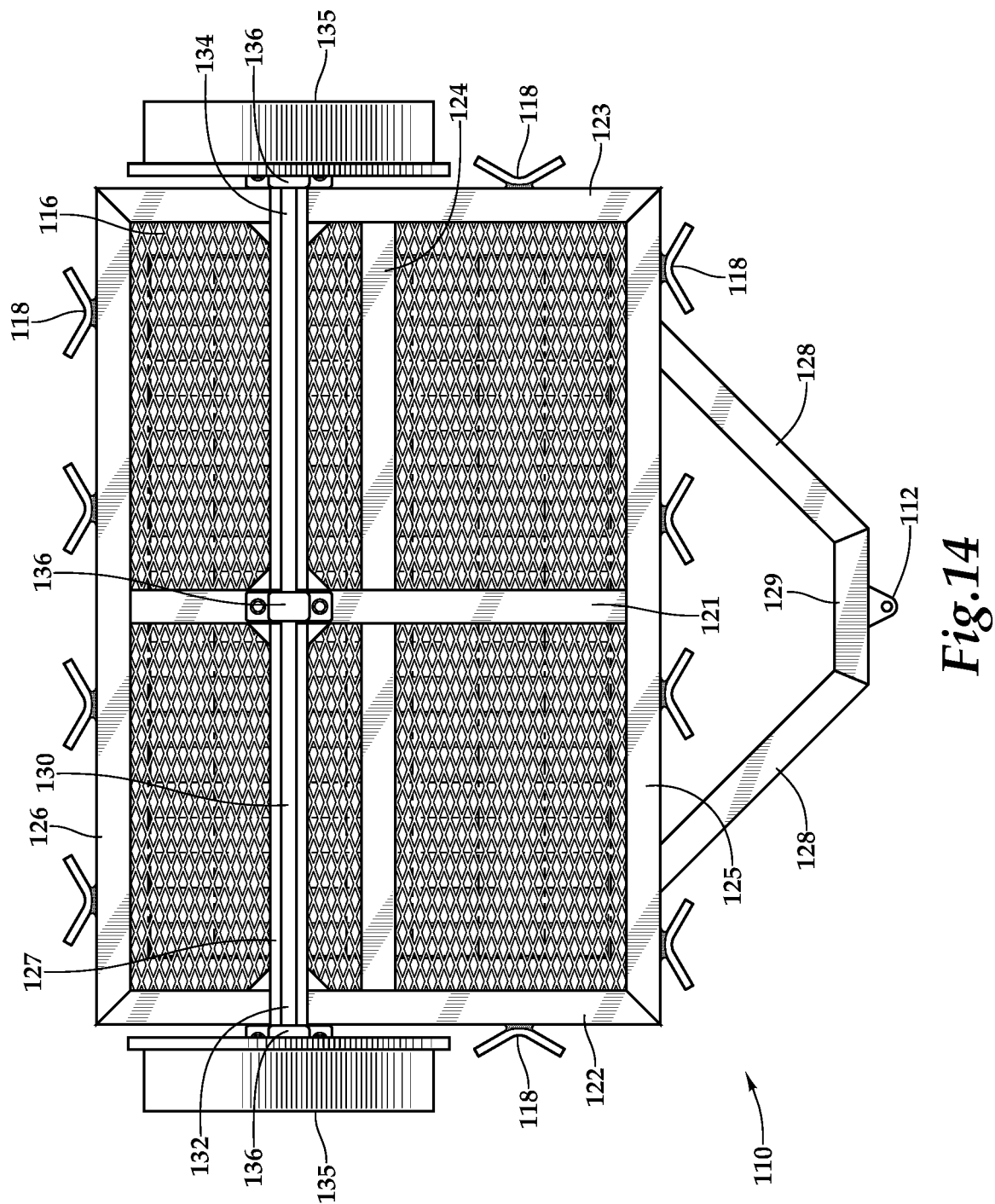
FIG. 14 is a bottom plan view of that which is shown in FIG. 11.
Figure 15:
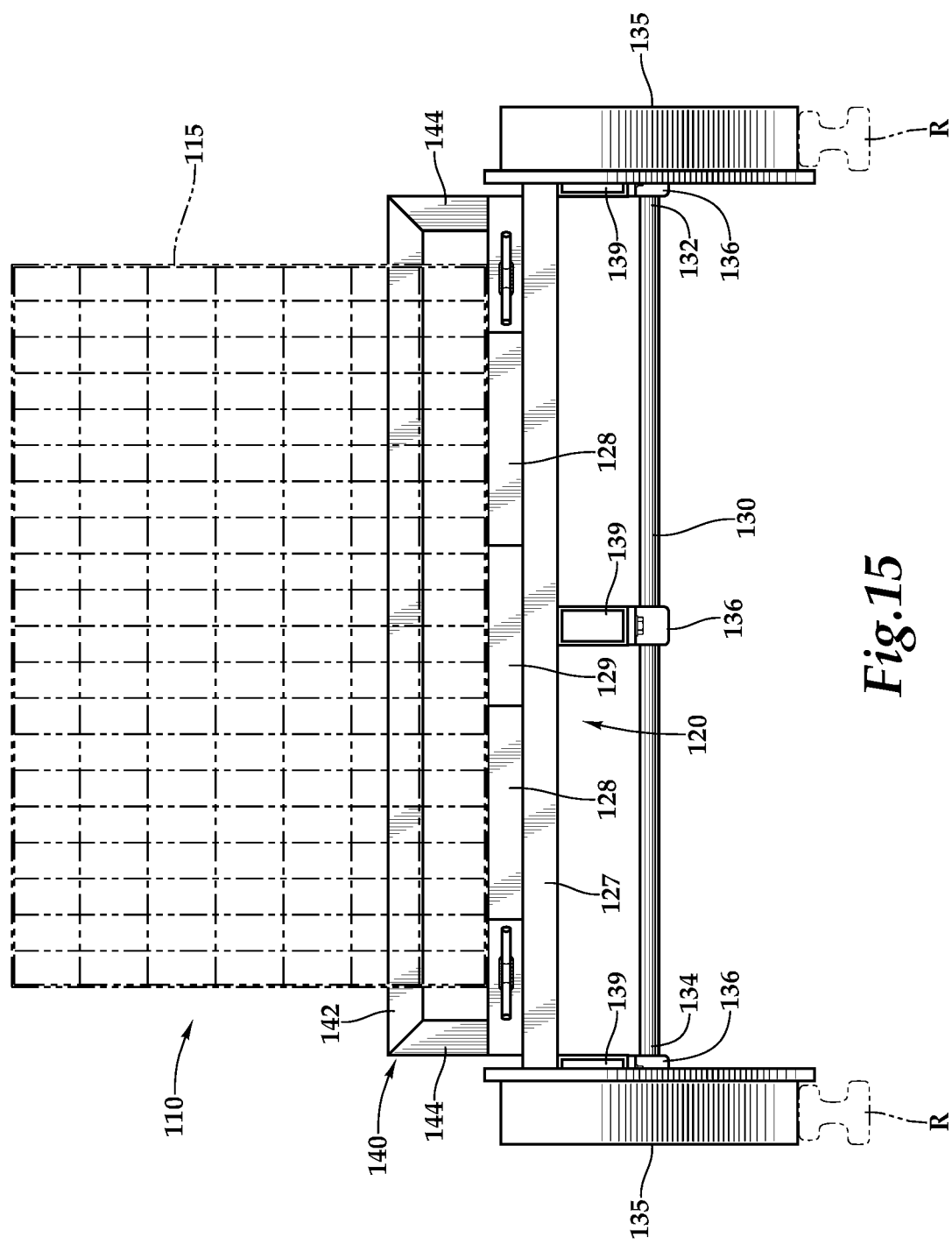
FIG. 15 is a front elevation view of that which is shown in FIG. 11.
Figure 16:
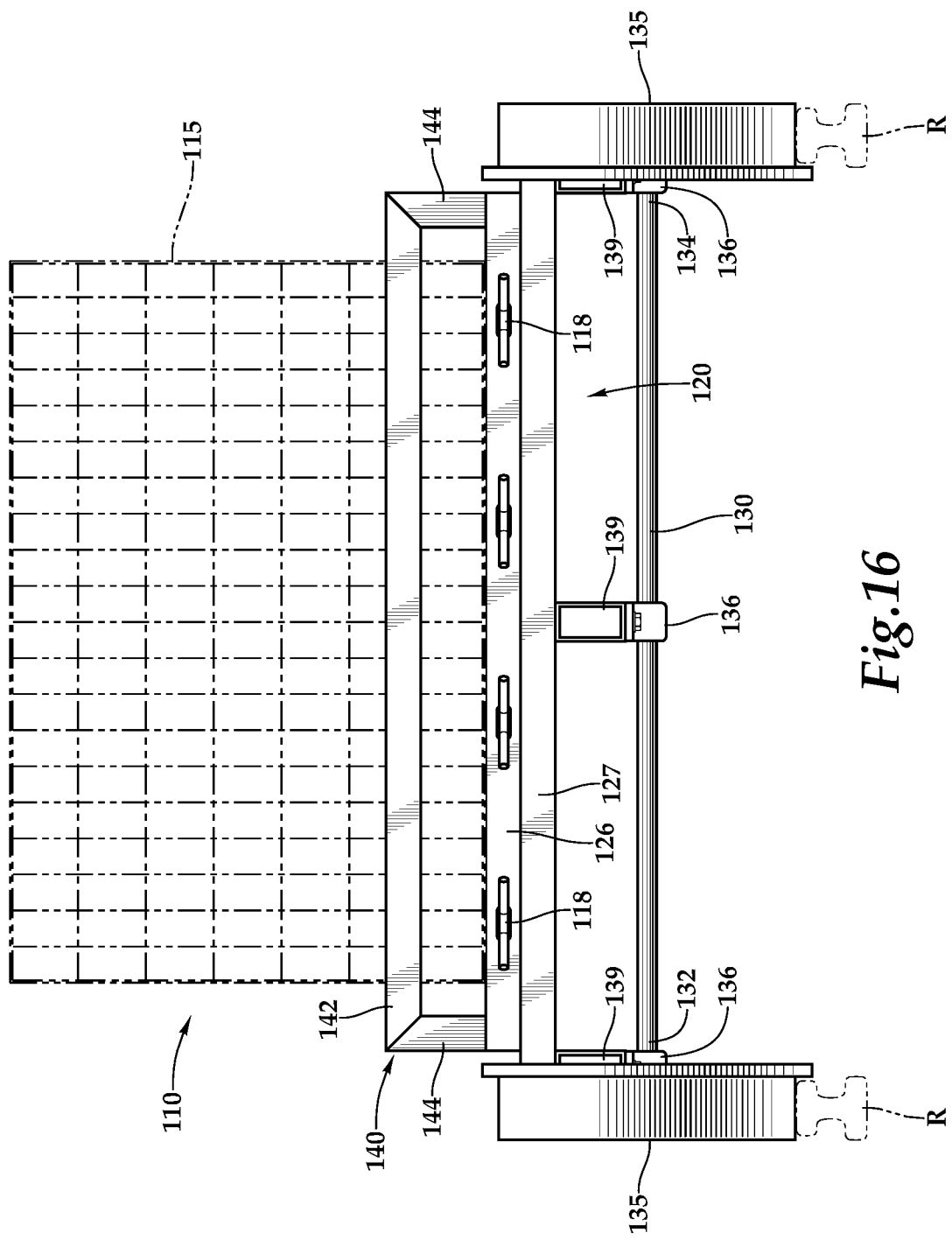
FIG. 16 is a rear elevation view of that which is shown in FIG. 11.
Figure 17:
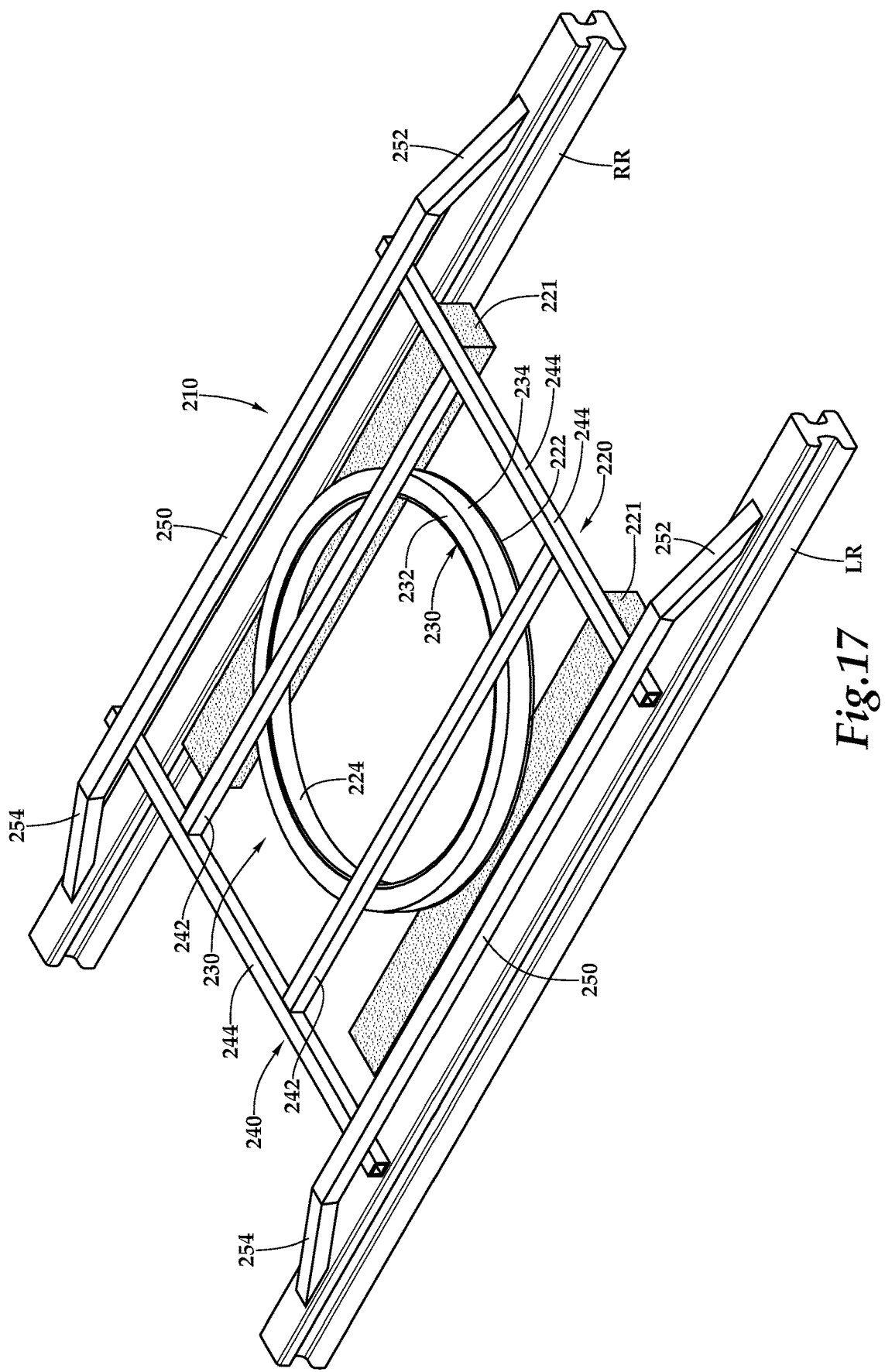
FIG. 17 is a perspective view of a turntable apparatus suitable for re-orienting vehicles such as that depicted in FIG. 1, the turntable depicted according to one embodiment of the invention.
Figure 18:
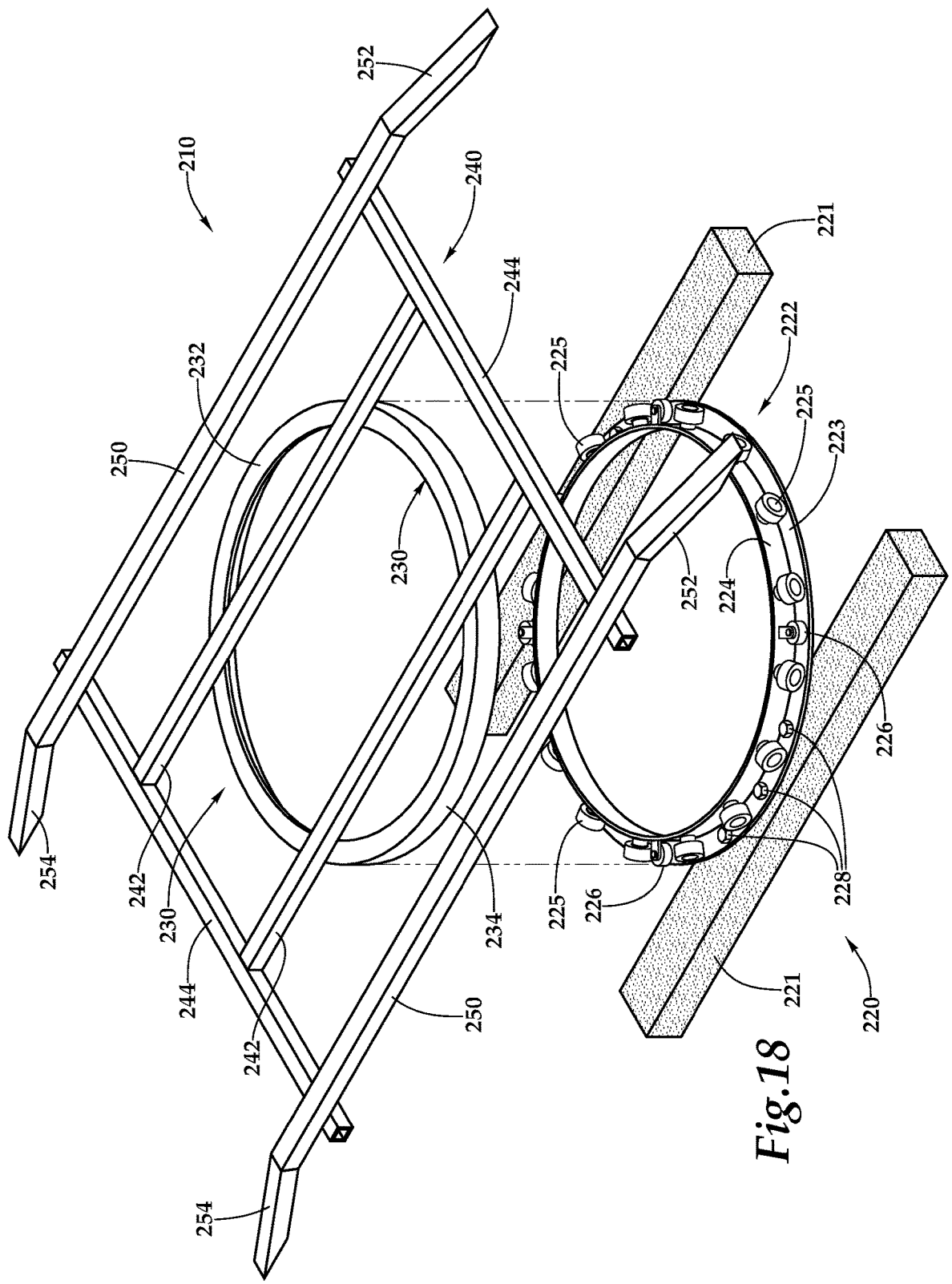
FIG. 18 is a perspective exploded parts view of the turntable of FIG. 17.

Referring to the drawings, wherein like reference numerals represent like parts throughout the various drawing figures, reference numeral 10 is directed to a vehicle configured to ride upon rails R (FIG. 2). The vehicle 10 is powered by a combination of cranking of pedals 42 by the user to drive at least one wheel 35 of the vehicle 10 and also an electric motor 52 powered by a battery 55 to drive at least one wheel 35 of the vehicle 10. The vehicle 10 can be driven alone or in a convoy of vehicles 10, and can optionally carry a trailer 110 (FIG. 11) behind the vehicle 10. A turntable 210 can conveniently be provided for re-orienting of vehicles 10 if the vehicles 10 are to return along the railway R from a destination back to an origin.

Figure 1:
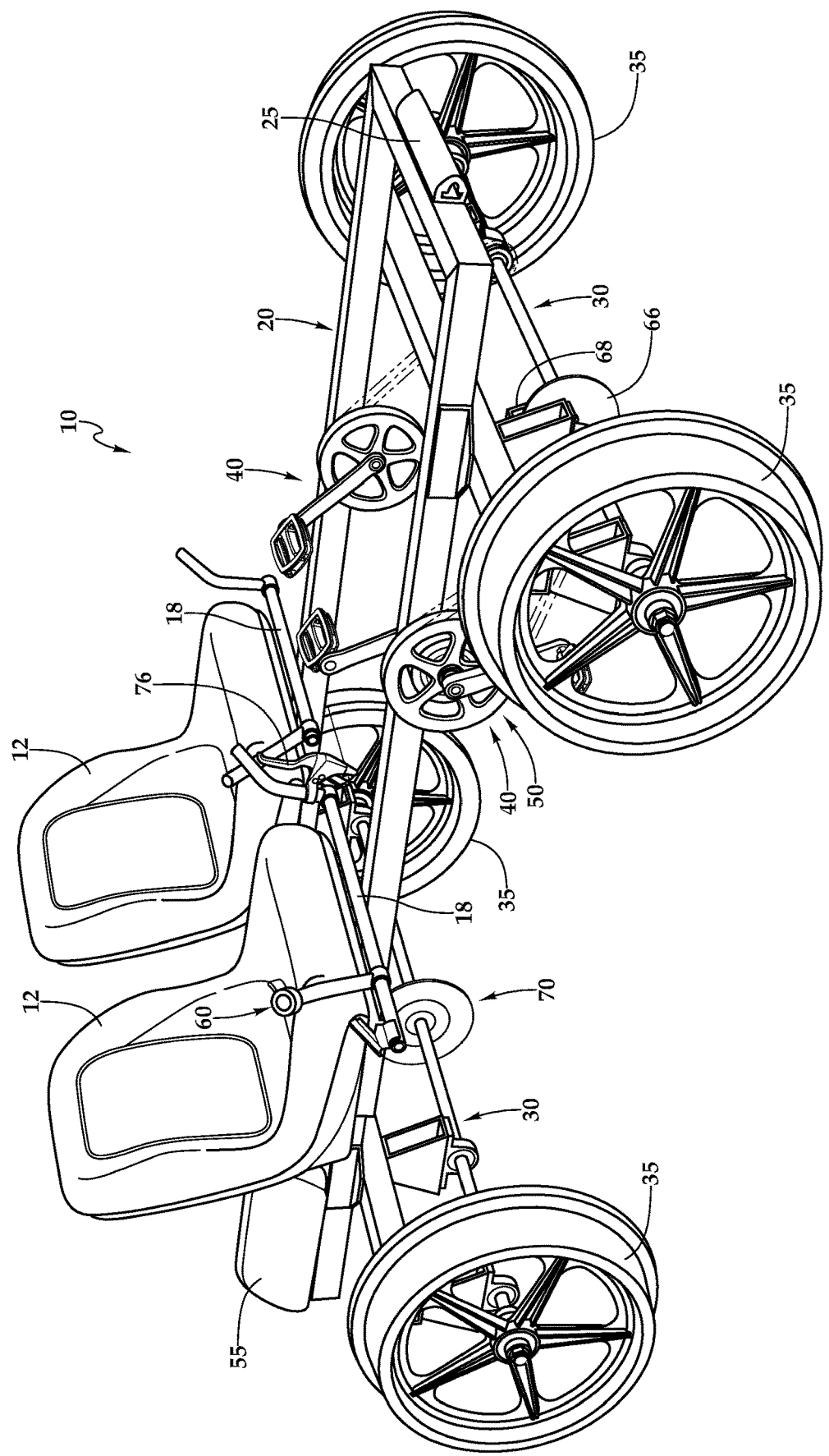
FIG. 1 is a front perspective view of a railway vehicle according to one embodiment of this invention.

In essence, and with particular reference to FIG. 1, basic details of the vehicle 10 are described, according to one example embodiment depicted therein. The vehicle 10 includes a frame 20 with a pair of axles 30 rotatably supported by the frame 20. Wheels 35 at the end of each axle 30 are configured to ride upon rails R (FIG. 2). The vehicle 10 includes a manual power system 40 featuring pedals 42 and associated structure to cause one of the axles 30 and associated wheels 35 to turn under human power delivered through the manual power system 40. An electric power system 50 is also coupled to one of the axles 30 and wheels 35 associated therewith. The electric power system 50 delivers electric power from the battery 55 through a motor 52 and then through appropriate power transmission equipment separate from or shared with the manual power system 40, so that electric power can also move the vehicle 10. A throttle 60 and associated control systems can allow for control of an amount of electric power delivered to wheels 35 of the vehicle 10. A brake disk 70 is provided on one of the axles 30 which can be engaged by a brake system controllable by user for controlling speed of the vehicle 10.

A trailer 110 (FIG. 11) can be coupled to a vehicle 10 so that the vehicle 10 can carry the trailer 110 upon the railway R along with the vehicle 10. The trailer 110 includes a frame 120 with an axle 130 rotatably supported thereby, and with two wheels 135 at each end of the axle 130. A deck 116 on the trailer 110 can carry various different items, such as optionally carrying a pet enclosure 115.

Figure 19:
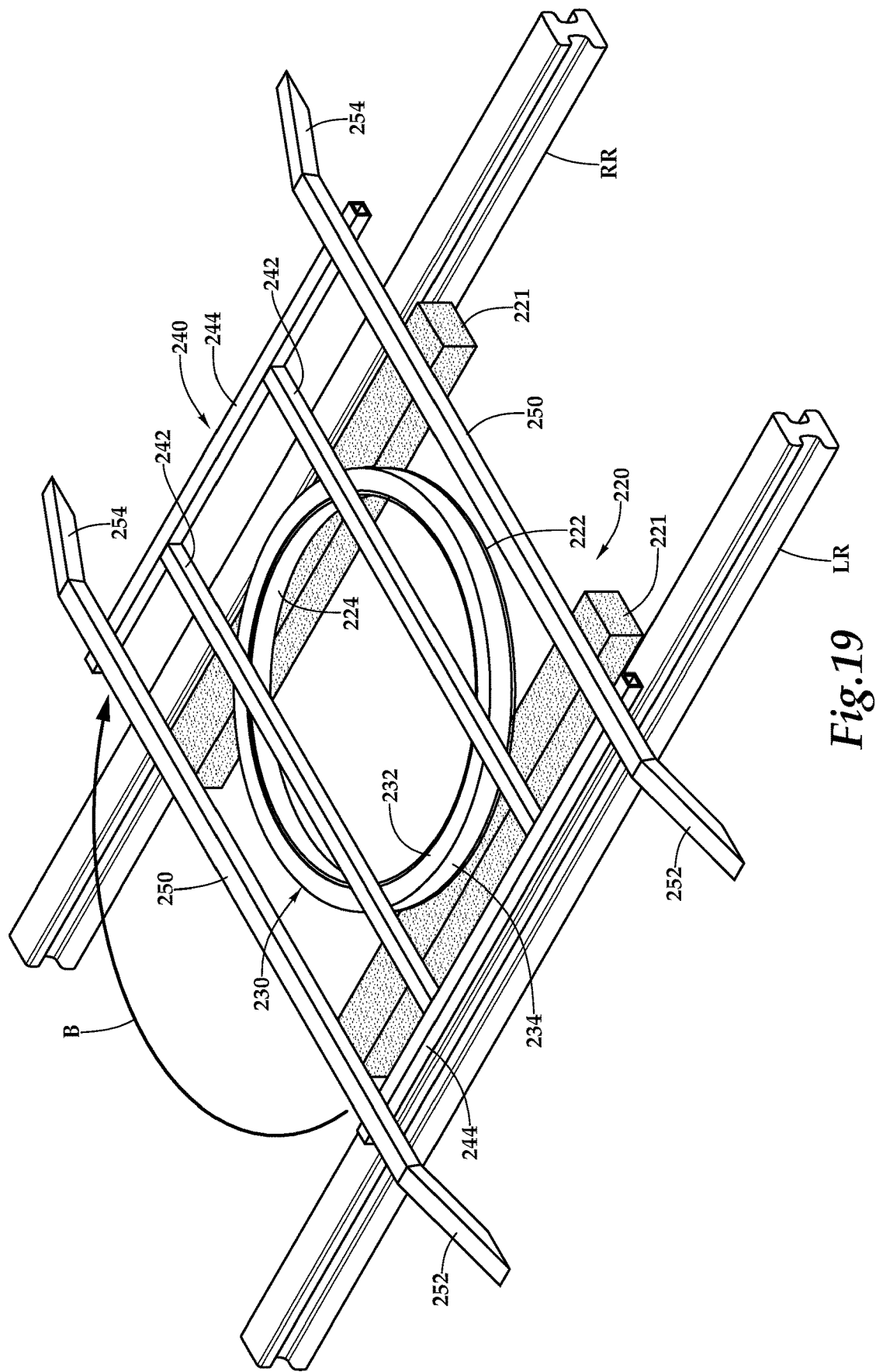
FIG. 19 is a perspective view similar to that which is shown FIG. 17, but with upper portions of the turntable rotated 90° relative to underlying rails, such as it would be oriented when halfway through a process of reorienting a vehicle upon a railway, according to the embodiment of FIG. 17.

A turntable 210 is associated with a system for managing the railway R including vehicles 10 thereon, or similar vehicles. The turntable 210 includes a base 220 typically having a fixed position between rails R. The base 220 includes a ring 222 as part of a bearing which also includes a cover 230 which rotates relative to the ring 222. The cover 230 carries a structural frame 240 thereon and with rail segments 250 carried upon the structural frame 240. A vehicle, such as the vehicle 10, can be rolled off of a left rail LR and a right rail RL and up onto the rail segments 250 while the rail segments 250 are aligned with the rails R. The rail segments 250 along with the structural frame 240 and cover 230 can then be rotated relative to the ring 222 and base 220 (along arrow B of FIG. 19) to re-orient the rail segments 250 and vehicle 10, such as 180° for return of the vehicle 10 in an opposite direction upon the rails R, or rotation to some other angular displacement for alignment with other rails R adjacent to the turntable 210. Upper portions of the turntable 210 can be removed relative to lower portions of the turntable 210, so that the left rail LR and right rail RL are not blocked by the turntable 210 when disassembled and not in use, while typically keeping a base 220 of the turntable 210 in position between the rails R.

More specifically, and with particular reference to FIGS. 1-9, details of a frame 20 and axles 30 of the vehicle 10 are described, according to this example embodiment. The frame 20 is interposed between seats 12 on the vehicle 10 and the axles 30 which carry the wheels 35 for riding upon rails R of a railway. The frame 20 also carries the manual power system 40 and electric power system 50 upon the axles 30, as well as maintaining spacing and orientation between the two axles 30 and lending general rigidity and form to the overall vehicle 10. The frame 20 is preferably a rigid structure formed of separate members which are either welded together, formed together (such as by bending) or fastened together, such as through brackets 23.

The frame 20 includes two long members 22 (also referred to as frame rails) which are parallel with each other and generally oriented aligned with a direction of vehicle 10 travel. These two long members 22 are preferably oriented within a common horizontal plane which is located above the axles 30. In various different embodiments, the long members 22 could conceivably be oriented beneath the axles 30 and/or could conceivably be oriented in a manner non-parallel with each other and/or with a non-linear form. Most preferably, the long members 22 and other members forming the frame 20 are hollow box beams having a square cross-section. One suitable material for forming the various members of the frame 20 is aluminum. However, other cross-sectional of forms for the members of the frame 20 could be provided, and other materials could be used.

The long members 22 are joined together in this example embodiment with a front member 24 at forward ends of the long members 22 and a rear member 26 at rearward ends of the long members 22. The long members 22, front member 24 and rear member 26 are preferably all oriented within a common plane and form a rectangle with a longest dimension extending in the direction of vehicle travel. A bumper 25 is preferably carried on a forward side of the front member 24. This bumper 25 is preferably formed of resilient material, such as rubber, and is provided so that if two vehicles 10 bump into each other while riding along a common railway R, that shock loads between the vehicles 10 would be somewhat dampened and attenuated. Ideally, the vehicles 10 are configured and operated so that they do not impact other vehicles 10 in normal operation, with the bumpers 25 provided as a back up safety measure in a typical embodiment.

The frame 20 includes a forward member 27 located beneath the long members 22 and oriented perpendicular to the long members 22, generally aligned with a forward one of the axles 30. The forward member 27 is preferably coupled to each of the long members 22 through a bracket 23 and associated fasteners. As an alternative, the forward member 27 could be welded or otherwise attached to the long members 22. The forward member 27 rotatably supports a front one of the axles 30 beneath the forward member 27, as described in detail below. A rearward member 28 is coupled to and located beneath the long members 22 generally adjacent to a rear one of the axles 30. The rearward member 28 can be similar in configurations to the forward member 27 and similarly attached to the long members 22 through brackets 23 and associated fasteners at a location generally above a rear one of the axles 30. The rearward member 28 is provided within the frame 20 to provide for secure rotational support of the rear one of the axles 30 relative to the frame 20.

A series of pedestals 29 (also referred to as risers) extend down from both the forward member 27 and the rearward member 28. Each of the pedestals 29 supports a bearing 36 at a lower end of the pedestals 29 which rotatably supports a portion of one of the front or rear axles 30. In this example embodiment, four pedestals 29 are provided beneath the forward member 27 and four pedestals 29 are provided beneath the rearward member 28. The pedestals 29 are preferably also formed of aluminum and preferably have a trapezoidal shape with diagonal sides tapering from a lower end to an upper end, and with the lower end being larger than the upper end. The upper ends of the pedestals 29 are affixed to an underside of the forward member 27 or rearward member 28. The lower ends of each of the pedestals 29 preferably carry the bearings 36 underneath.

The pedestals 29 are strategically located for rotatable support of the axles 30 relative to the frame 20 and to successfully carry loads upon the frame 20 as well as the weight of the frame 20 itself, through the axles 30 and onto the wheels 35 at the left end 32 and right end 34 of the axles 30. As one arrangement in this example, two of the pedestals 29 are generally located beneath the long members 22 of the frame 20 and two of the pedestals 29 are located at the ends of the forward member 27 and rearward member 28 adjacent to the wheels 35 and ends 32, 34 of the axle 30. In this way, bending loads acting on the axles 30 are minimized.

The axles 30 are preferably elongate cylindrical rigid high strength elements (such as formed of steel) which are configured to rotate relative to the frame 20 and with wheels 35 affixed to ends 32, 34 of the axles 30. Two similar axles 30 are provided, including a front and a rear axle 30. The front and rear axles 30 are preferably substantially identical to each other. Ends of the axles 30 including the left end 32 and right end 34 can be threaded or otherwise configured to allow wheels 35 to be removably attached thereto.

While the wheels 35 could be supported on the axles 30 through wheel bearings, most preferably the axles 30 are affixed to the wheels 35 so that the axles 30 turn with the wheels 35. In this way, rotational power can be transferred to the axles 30 to cause rotation of the axles 30 as well as the wheels 35 to move the vehicle 10. Similarly, with affixation of the axle 30 to the wheels 35, a brake disk 70 affixed to one of the axles 30 can have a braking system act thereupon to absorb energy and reduce speed of the vehicle 10, such as under control of an operator riding upon the vehicle 10.

The bearings 36 are positioned beneath each of the pedestals 29. In one embodiment, the bearings 36 are in the form of pillow bearings. Different types of bearings, which provide rotational support for a rotating shaft relative to a fixed structure, can be used for the bearings 36. While four such bearings 36 are provided in this embodiment, different numbers of bearings could be utilized. The bearings preferably include grease fittings for the insertion of grease in the bearings and to maintain low friction rotational support between the frame 20 and the axles 30.

The wheels 35 are provided with one wheel 35 at each end 32, 34 of each axle 30. Length of the axles 30 and spacing between the wheels 35 is selected to match a gauge of rails R on a railway upon which the vehicle 10 is configured to operate. Typically, the vehicle 10 is specifically configured for a particular gauge of railway. As an option, the wheels 35 could be configured to attach to the axles 30 at various different positions thereon to provide adjustability and use of the vehicle 10 on railways having different gauges. The wheels 35 are preferably formed of a polymeric hydrocarbon material such as polyurethane or a high density rubber. The wheels 35 could alternatively be formed from a variety of different materials, including steel and other metals.

As a general principle, making the vehicle 10 lighter allows for human power to accelerate the vehicle 10 more quickly and to make it easier to drive the vehicle up grades to a higher elevation. On the other hand, railway wheels, which include flanges on inside edges thereof to keep them on the rails R, beneficially utilize weight of the vehicle 10 as one factor to resist vertical movement of the vehicles 10 relative to the rails R and the vehicle 10 climbing off of the rails R, experiencing a derailment event. Thus, maintaining at least some significant weight within the vehicle 10 can be advantageous, so that it is not necessarily an imperative that weight be saved at every opportunity. Even when formed of polyurethane or other hydrocarbon materials, the wheels 35 still exhibit significant weight, which, along with other portions of the vehicle 10, cause the vehicle 10 to typically have a weight between 200 and 300 pounds (about 250 pounds in one example). The vehicle 10 generally avoids derailment in such a configuration.

With continuing reference to FIGS. 1-9, details of the manual power system 40 are described, according to this example environment. The manual power system 40 is supplied so that users of the vehicle 10 can use human power to cause the vehicle 10 to move. By utilizing human power, users get beneficial exercise and have the satisfaction of supplying the power required to move the vehicle 10. Furthermore, the vehicle 10 to some extent is simplified by utilization of human power.

The manual power system 40 includes pedals 42 rotatably coupled to ends of cranks 44 which are pivotably supported to the frame, such as through a bottom bracket assembly coupled to the long members 22 of the frame 20. The cranks 44 support an output sprocket 48 which carries a chain 46 down to an input sprocket 45 on the front axle 30. A tensioner 47 can be provided adjacent to the chain 46, which keeps tension on the chain 46 through a roller at a tip of the tensioner 47 which engages the chain 46. Typically, the output sprocket 48 has a greater number of teeth than the input sprocket 45. The input sprocket 45 is mounted to one of the axles 30 (typically the front axle 30) so that rotation of the pedals 42 and crank 44 causes revolution of the chain 46 through rotation of the outer sprocket 48, and in turn causes the input sprocket 45 to rotate, and causes the axle 30 associated with the input sprocket 45 to also rotate. Most preferably, either the input sprocket 45 or output sprocket 48 includes a free wheel mechanism associated therewith. In this way, if the pedals 42 and cranks 44 stop rotating, the axles 30 can continue to freely rotate. A user of the vehicle 10 thus does not need to continue to pedal at all times and can let feet rest upon the pedals 42. The sprockets 45, 48 and chain 46 could be replaced with gears or other drive structure in other embodiments.

In the example embodiment shown herein, the vehicle 10 is configured with two manual power systems 40, one in front of each of two seats 12. The seats 12 are carried upon the long members 22, through mounting brackets 14. These mounting brackets 14 allow the seats 12 to slide forwardly and rearwardly along the long members 22, and can utilize a clamp 16 to lock the seats 12 in place relative to the long members 22. Different leg lengths of different users can thus be accommodated between the seats 12 and the pedals 42 and cranks 44 of the manual power system 40.

With the seats 12 carried upon the same long member 22 which carries the pedals 42 and cranks 44, a generally recumbent riding position is provided for the user, with the seat at a similar elevation (just slightly above) and elevation of the pedals 42 and cranks 44. The pedals 42 and cranks 44 are rotatably supported by the bottom bracket assembly to the long members 22 of the frame 20, typically by attachment to an under surface of the long members 22. This causes the pedals 42 to have an average elevation slightly below that of lower portions of the seat 12. Such a generally recumbent riding position for users sitting upon the seat 12 allows the users to comfortably look both forward and upward, such as up at a tree canopy or other structures adjacent to the user, but above the railway upon which the vehicle 10 is traveling. A comfortable sitting position and vantage point is thus provided for the users.

With two manual power systems 40, one mounted to each of the long members 22 of the frame 20, two chains 46 or other drives (such as direct gear linkages) deliver power at different locations on the front one of the axles 30. With two input sprockets 45 on the front one of the axles 30, each input sprocket 45 driven by one of the two manual power systems 40, and with each of the input sprockets 45 including a free wheel associated therewith, one user can be paddling with the manual power system 40, while the other user does not need to be also pedaling. Users are liberated to pedal when they wish to pedal and to rest when they wish to rest. Riding of the vehicle 10 is thus further enhanced.

Each of the seats 12 preferably includes a handlebar 18 which is an elongate horizontal structure with grips on ends thereof. These grips extend upwardly from a central portion of the handlebar 18 structure. The grips of the handlebars provide a convenient location for a user to rest hands of the user while riding on the vehicle 10. The grips of the handlebars also provide a convenient location for brake controls and electric power system 50 controls, as described in detail below.

Figure 8:
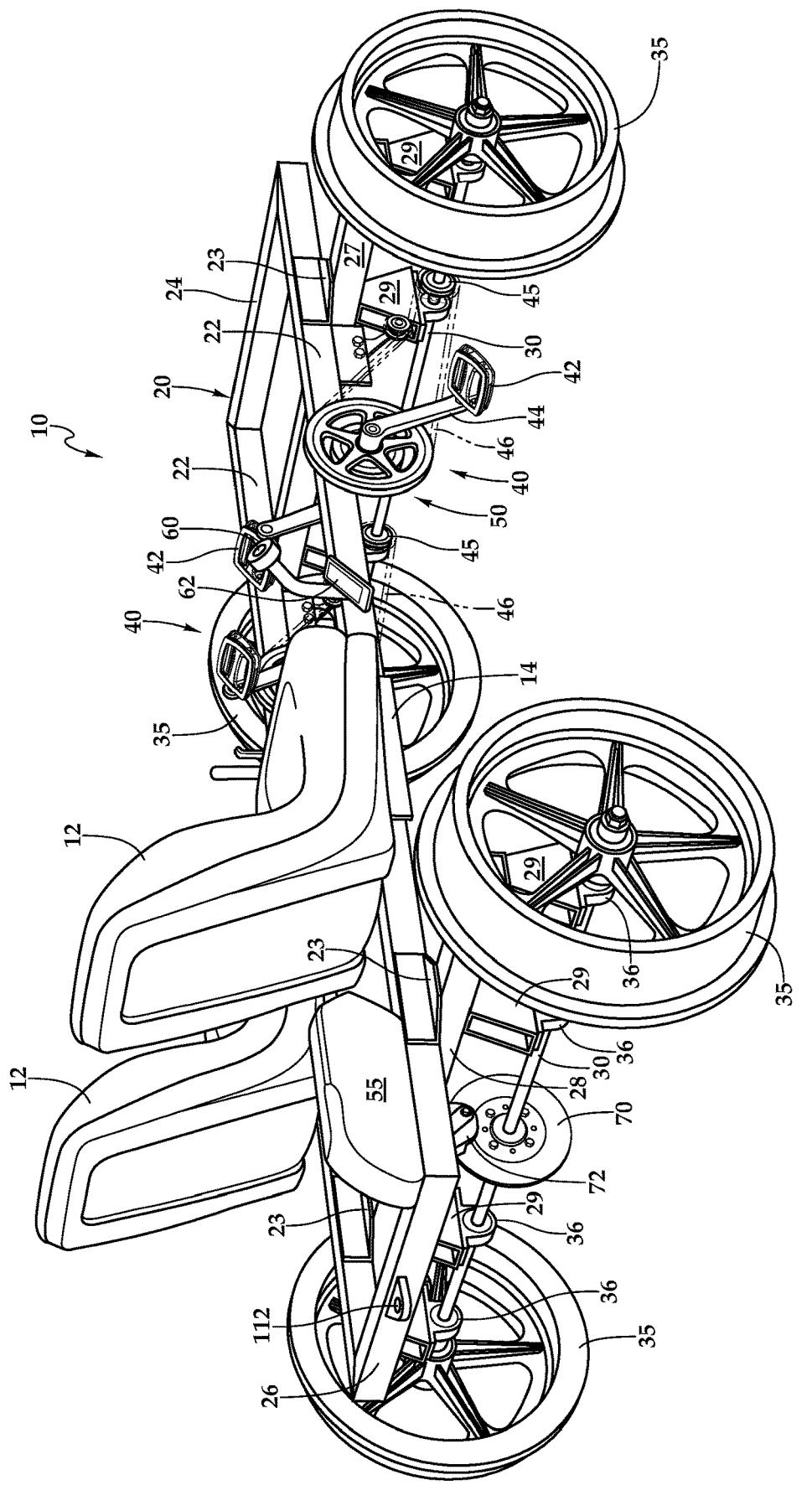
FIG. 8 is a rear perspective view of that which is shown in FIG. 1.
Figure 9:
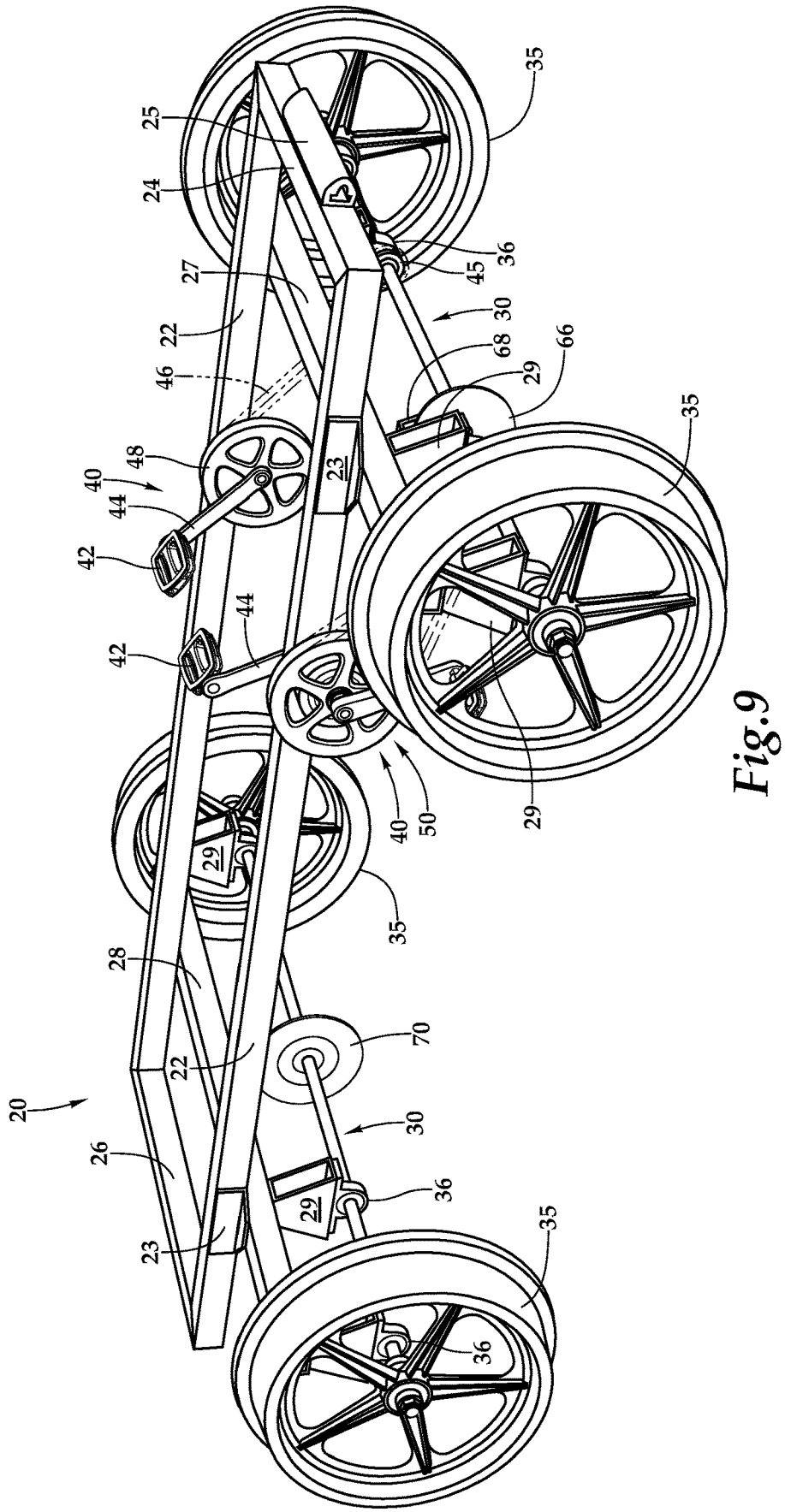
FIG. 9 is a front perspective view of the vehicle of FIG. 1 with the seats and associated assemblies removed, as well as a battery, to more particularly show frame, axle and manual power system details according to one embodiment of this invention.
Figure 10:
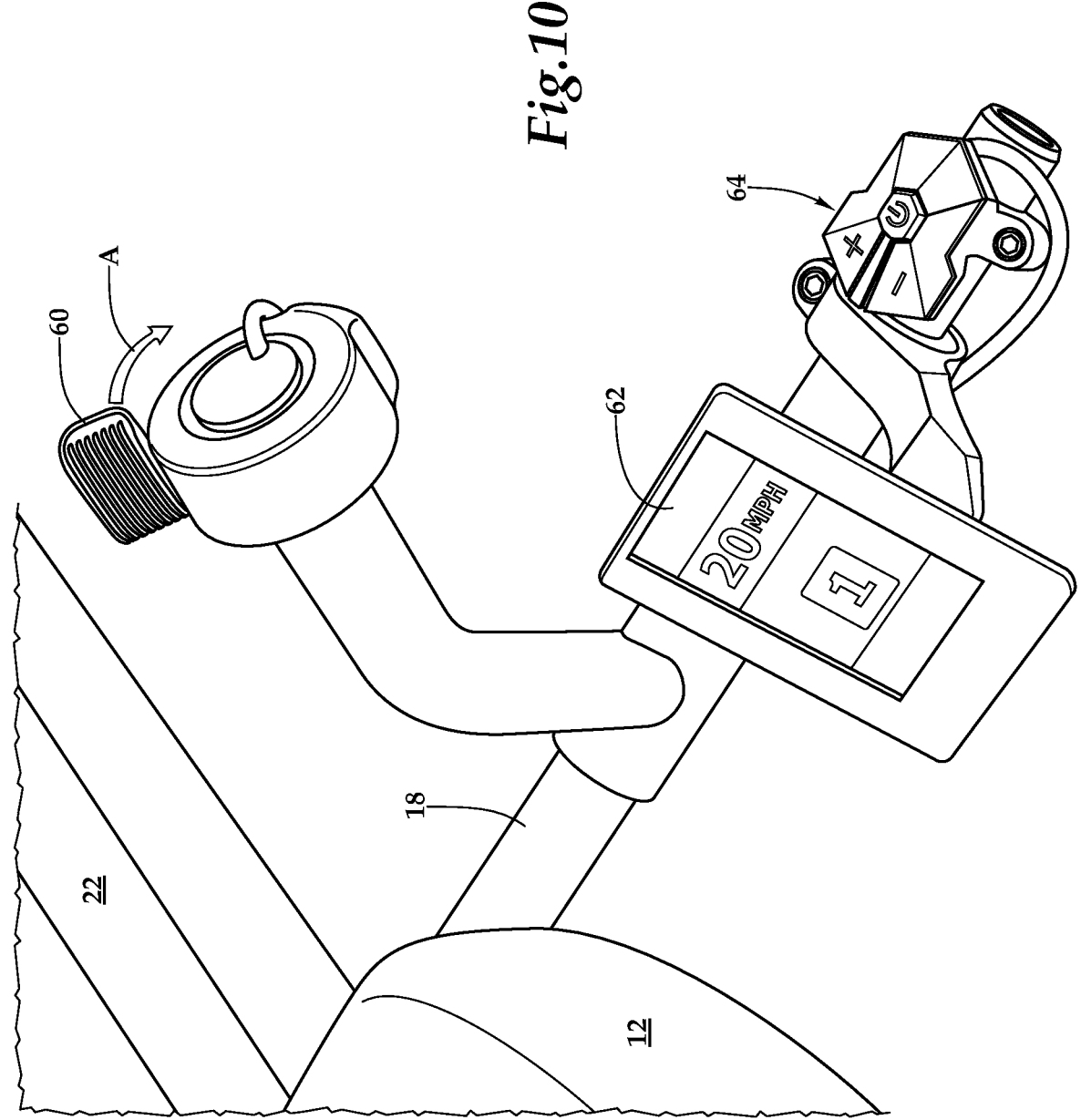
FIG. 10 is a perspective view of a throttle power control element and associated controls provided with one embodiment of the vehicle of FIG. 1.

With continuing reference to FIGS. 1-9, as well as FIG. 10, details of the electric power system 50 of the vehicle 10 are described according to this example embodiment. While the electric power system 50 could be left out of the vehicle 10 in some embodiments, most preferably the electric power system 50 is provided to optimize performance of the vehicle 10 and enhance enjoyment for users of the vehicle 10. The electric power system 50 utilizes an electric motor 52 drawing power from a battery 55 located upon the vehicle 10. The electric motor 52 has an output coupled to a transmission 54 which is integrated into the output sprocket 48 of at least one of the manual power systems 40 carried on the vehicle 10.

In this example embodiment, only one such manual power system 40 includes the electric power system 50 integrated therein, while in alternative embodiments it is conceivable that each of the manual power systems 40 could have an electric power system 50 integrated thereinto. Wiring 58 couples the battery 55 to the electric motor 52 to cause the electric motor 52 to output mechanical power into the transmission 54 to cause rotation of the output sprocket 48 and in turn revolution of the chain 46 and rotation of the input bracket 45 and axle 30. As an alternative, the electric motor 52 could be coupled to an axle 30 separate from the manual power system 40.

A throttle 60 is coupled into the wiring 48 which can control an amount of power supplied to the electric motor 52 or otherwise control the motor 52 with a control signal which varies based on manual adjustment of the throttle 60. In particular, and with reference to FIG. 10, the throttle 60 is in the form of a lever which can rotate (along arrow A of FIG. 10) and is mounted to an upper end of a grip of a handlebar 18 associated with one of the seats 12. As the throttle 60 is moved (along arrow A) a greater and greater amount of electric power is caused to be outputted from the motor 52 through the transmission 54 and to the axle 30 for driving of wheels 35 of the vehicle 10.

A display 62 can provide a display of speed of the vehicle 10, such as by rosacea of a speedometer disk 66 and associated speedometer sensor 68 wired into the display 62 (see FIGS. 1 and 9, as well as FIG. 10. Buttons 60 for operation of the display 62 allow for turning on and off the display 62 and also allow for selecting of different power settings for the motor 52. For instance, and in one embodiment, two different power settings are provided, including a low power setting and a high power setting. The low power setting can be designated as power setting "one" and the high power setting can be designated as power setting "two." At the higher power setting, a greater amount of mechanical power is outputted from the electric motor 52 then in the lower setting.

As an example, the higher power setting might help a vehicle 10 to travel up a steep grade, while the lower power setting would be suitable for flat sections of railway and preserve battery 55 energy storage for later use. Preferably, the battery 55 can be replaced with other batteries in a readily swappable fashion. In this way, if a vehicle 10 runs out of power, its separate reserve battery can be swapped with the used up battery 55 to allow the vehicle 10 to continue to operate with electric power assist.

The electric power system 50 is configured so that the transmission 54 can add no power or some power, either automatically or under the control of a user, to enhance vehicle 10 performance and without necessarily requiring harder work in driving the manual power system 40 by the user. Most preferably, the electric power system 50 is configured to free wheel or otherwise disengage when not in use, so that the electric motor 52 does not resist the manual power system 40 in any of its modes of operation (other than a possible optional regenerative braking mode).

Most preferably in this example embodiment, power is delivered from the motor 52 to the vehicle 10 in two different ways. First, the motor 52 and transmission 54 can sense when the manual power system 40 is being utilized by a user rotating the pedals 42 and can add a basic low level of electric power through the motor 52 to assist the user and provide greater power to the vehicle 10 than that which is provided through the manual power system 40 alone. Such automatic electric assist only occurs when the manual power system 40 is being utilized. This mode of operation causes power delivered by a user through the manual power system 40 to be in effect amplified automatically by the electric power system 50. Such electric power assist can be deactivated if desired, for a pure manual power system 40 driving of the vehicle 10.

In a second mode of operation, a user utilizes the throttle 60 by movement of the throttle 60 (along arrow A in FIG. 10) to cause greater electric power to be delivered through the electric power system 50 to the vehicle 10. In this way, still greater amounts of electric power are supplied to the vehicle 10. Thus, a user can have support of the electric power system 50 either just by cranking the pedals 42 of the manual power system 40, or by actuating the throttle 60 to deliver power only from the electric power system 50, or combined power from the electric power system 50 and the manual power system 40.

While railways typically only have gradual grades built into them, the significant weight of the vehicle 10 causes even shallow grades in the railway to be significant impediments to navigation of the vehicle 10 up such a grade by use of the manual power system 40 alone. Even highly physically fit and well trained cyclists are typically not accustomed to powering a 250 pound bicycle up even a relatively shallow grade. While the vehicles could be made lighter to facilitate manual power alone through the manual power system 40, lightening the vehicle 10 significantly increases risk of derailment of the vehicle turn off of the rails R. Without the electric power system 50, the trade-offs between vehicle weight and vehicle 10 movement difficulty leave no highly satisfactory options. The resulting vehicle 10 having only a manual power system 40, thus becomes significantly less enjoyable, except perhaps when operating on the flattest of rails R.

With the electric power system 50 of this invention, the benefits of having a manual power system 40 augmented by an electric power system 50 in the various different modes of operation described above, compensate for this extra vehicle weight to preserve an enjoyable vehicle 10 riding experience, even when going up shallow and steep grades within the railway. A greater number of railways can thus be experienced by riders on such a vehicle 10. Often railways within mountain settings have spectacular scenery, but also steeper grades, which can now be accessed easily with the vehicle 10 of this invention, incorporating both the manual power system 40 and electric power system 50.

A brake system is provided including a brake disk 70, which is provided with this example embodiment vehicle 10 on the rear one of the axles 30. A caliper 72 is located adjacent to the brake disk 70. A cable 74 leads from the caliper 72 (and associated brake pads) to a lever 76 pivotably attached adjacent to one of the grips on one of the handlebars 18 associated with one of the seats 12 on the vehicle 10. A user can move this lever 76 and cause the cable 74 to actuate the caliper 72 and brake pads against the brake disk 70, to apply friction and torque deceleration of the rear axle 30. A rigid sleeve 78 surrounds the axle 30 and spans a space between the brake disk 70 and an adjacent bearing 36. This sleeve 78 keeps the brake disk 70 from migrating toward the bearing 36, which otherwise could cause the caliper 72 (and associated brake pad(s) to rub against the brake disk 70 when the brake is not being applied. In one embodiment, the lever 76 can be locked in a braking position, such as by including a clasp or pin to secure the lever 76 in a locked position. In this way, the caliper 72 and brake pads can remain secured to the brake disk 70 and act as a form of parking brake when the vehicle 10 is not intended to be in motion. Other forms of brake systems could alternatively be provided, and could be provided on either the front or rear axles 30.

With particular reference to FIGS. 11-16, details of a trailer 110 are described, which is attachable to the vehicle 10 and able to be carried upon rails R upon which the vehicle 10 is traveling, according to one embodiment of the invention. The trailer 110 enhances utility of the vehicle 10 by allowing for additional items to be carried by the vehicle 10, trailing behind (or conceivably in front of) the vehicle 10. A hitch 112 can be incorporated into the frame 20, such at the rear member 24 as depicted in FIG. 8, which can allow for a linkage 115 to flexibly attach between the trailer 110 and the vehicle 10. In one embodiment, the trailer 110 includes a cage 115 carried upon the trailer 110, which cage 115 can carry pets, so that the pets can enjoy a ride on the vehicle 10 along with the user(s).

The trailer 110 includes a frame 120 with an axle 130 rotatably supported relative to the frame 120. The frame 120 is a rigid structure made up of separate members to give overall strength and rigidity to the trailer 110 and allow for carrying of objects upon the trailer 110, while rotatably supported upon the axle 130 and associated wheels 135 beneath the trailer 110. Typically, a deck 116 is carried upon the frame 120 which can then carry objects upon the deck 116. Tie down ears 118 are provided around a perimeter of the frame 120, which can accommodate tie down straps for securing of objects upon the deck 116 or otherwise upon the frame 120, such as, in one example, a cage 115 for safely carrying dogs or other pets.

The frame 120, in this example embodiment, includes a left member 122 and a right member 123 which are oriented parallel with each other and generally oriented in a direction of vehicle travel. A deck support member 121 is provided between the left member 122 and right member 123 for help in supporting the deck 116 upon these members 121, 122, 123. The deck 116 can be formed of expanded metal sheeting or otherwise be formed of materials which can rest upon the left member 122, right member 123 and deck support number 121, which generally are planar and define an upper portion of the frame 120.

Perpendicular to these members including the left member 122, right member 123 and deck support number 121 are a series of laterally oriented members including a central member 124, a leading member 125 and a trailing member 126. The central member 124, leading member 125 and trailing member 126 are preferably each oriented lateral to a direction of travel and parallel with each other. Diagonal members 128 extend forward from ends of the leading member 125 and toward each other where they are joined together through a lead member 129 which is generally parallel with the leading member 125. The central member 124, trailing member 126, leading member 127, diagonal members 128 and lead member 129 are preferably all formed in a common plane alone with the central member 121, left member 122 and right member 123, and are attached together by welding or otherwise.

An axle member 127 extends laterally and is located beneath the other members of the frame 120. This axle member 127 includes pedestals 139 extending downward from the axle member 127 for interconnection and rotatable support relative to the axle 130. The lead member 129 can include the linkage 114 pivotably supported relative thereto, which linkage 114 can be removably attached to a hitch 112 on a vehicle 10 to facilitate carrying of the trailer 110 by the vehicle 10. This linkage 114 could, in one embodiment, merely include hooks or loops on ends thereof and optionally be configured as a turnbuckle for length adjustability of the linkage 114 and convenient rotation of hooks or loops on the ends of the linkage 114 relative to each other for attachment to the hitch 112 on the vehicle 10. A similar hitch 112 can also be provided on the lead member 129 for support of a trailing end of the linkage 114.

An axle 130 is provided similar to the axle 30 associated with the vehicle 10. This axle 130 has wheels 135 on ends thereof, including a left end 132 opposite a right end 134. The pedestals 139 each support a bearing 136 which rotatably supports the axle 130 thereon. These bearings 136 are similar to the bearings 36 of the vehicle 10 in one embodiment, except that only three bearings 136 are provided, including a centrally located bearing 136 and bearings 136 located adjacent to each of the wheels 135. Loads upon the frame 120 are carried down through the axle member 127 of the frame 120 and then through the pedestals 139 to the bearings 136 for transfer to the axle 130 and carrying by the wheels 135 upon rails R. The wheels 135 can be similar to the wheels 35 described in detail above with respect to the vehicle 10.

In this example embodiment, the trailer 110 includes a tailgate 140 which is removably attachable to the trailer 110 and can help to keep structures from falling off of a rear of the trailer 110. The tailgate 140 includes an elongate horizontal bar 142 with vertical bars 142 at ends thereof which can removably attach to the trailing member 126 or other portion of the frame 120.

With particular reference to FIGS. 17-21, details of a turntable 210 for use with the vehicle 10 are described, according to one example embodiment. When the vehicle 10 operates on a railway including a left rail LR and a right rail RR, it is often convenient for the vehicle 10 to be turned around at a destination so that the vehicle 10 can return to an origin along the same railway. While the vehicles 10 can be picked up and manually re-oriented, due to the significant weight of the vehicle 10 (about 250 pounds) such manual re-orienting generally requires multiple personnel and has significant difficulty.

The turntable 210 preferably is configured into parts which are readily disassemblable and reassembleable. A first part includes a base 220 and a ring 222 which forms a portion of a hoop bearing associated with the turntable 210. A cover 230 as well as structural frame 240 and rail segments 250 form an upper portion of this turntable 210, with the cover 230 forming an upper portion of the hoop bearing along with the ring 222. Typically, lower portions of the turntable 210 are fixed in position at strategic locations where re-orienting of vehicles 10 is desired, while upper portions of the turntable 210 can be removably attached to the lower portions so that such upper portions can be removed when not needed and allow other rail traffic to pass through the area where the turntable 210 is located. As an alternative, the base 220 and ring 222 could also be made portable, as an option. Vehicles 10 could thus readily be re-oriented at various different locations along a railway.

The base 220 includes supports 221 which reside inboard of a left rail LR and a right rail RR and act as foundation elements for the base 220 of the turntable 210. The ring 220 rests upon (and is typically secured to) these supports 221, with the ring 222 providing a lower portion of the hoop bearing associated with the turntable 210. The ring 222 includes a planar floor 223 and a cylindrical flange 224 extending upwardly from an inboard edge of the floor 223. The floor 223 is annular in form with an inner curving edge and an outer curving edge space depart by a width of the floor 223. The flange 224 is cylindrical in form, extending up from the inner edge of the floor 223 to an upper edge of the flange 224.

Various different bearing structures are mounted to the ring 222 in one embodiment. These bearing structures include load bearings 225 and alignment bearings 226. The load bearings 225 are oriented to allow vertical weight loads associated with an upper portion of the turntable 210 to be rotatably carried upon these load bearings 225, such as to allow upper portions of the turntable 210 to rotate relative to the ring 222 and base 220 forming lower portions of the turntable 210. The load bearings 225 preferably have an axle rotatably supported from the flange 224 and with a rolling surface oriented to allow for a general planar structure above an upper edge of the flange 224 to rest upon the load bearings 225 and roll thereon. Multiple such load bearings 226 are provided at various different angularly displaced locations along the ring 222, so that weight loads are distributed upon the load bearings 225 and transferred to the ring 222 in a generally symmetrical fashion.

Alignment bearings 226 also extend from the flange 224 and include rollers which can abut against an outer cylinder generally concentric with and outboard of the flange 224. The alignment bearings 226 do not carry significant loads, but rather keep structures resting upon the ring 222 aligned concentrically with the ring 222. Fasteners 225 pass through the floor 223 overlying supports 221, to allow for the ring 222 to be securely affixed to the supports 221.

The cover 230 defines an upper portion of the hoop bearing of the turntable 210 and includes a cap 232 and side wall 234. The cap 232 is generally planar and annular in form, configured to rest upon the load bearings 225. The sidewall 234 is cylindrical in form and extends down from an outer edge of the cap 232, a distance similar to a height of the flange 224 which extends up from the floor 223 of the ring 222. The sidewall 234 abuts against the alignment bearing 226 and keeps the cover 230 aligned with the ring 222, to together form the hoop bearing of the turntable 210.

The cover 230 is preferably removable relative to the ring 222, so that upper portions of the turntable 210 can be moved separately from the lower portions of the turntable 210 and separated and set aside so that the railway, including the left rail LR and the right rail RR are kept free for the passage of traffic over the area where lower portions of the turntable 210 are located.

A structural frame 240 is attached to the cover 230, such as through the cap 232, via fasteners or welding or other attachment methodology. The structural frame 240 preferably includes two parallel members 242 which are spaced away from each other approximately ⅓ of a distance between the left rail LR and the right rail RR. These parallel members 242 are preferably similar in length and parallel to each other, terminating where they abut perpendicularly with end members 244. The end members 244 join ends of each of the parallel members 242 and define forward and rearward portions of the structural frame 240. Preferably the parallel members 242 and the end members 244 are all in a common plane, but the end members 244 could rest upon the parallel members 242 in one embodiment. The end members 244 are longer than a spacing between the left rail LR and the right rail RR.

Rail segments 250 are carried upon ends of the end members 244 with the rail segments 250 generally parallel with the parallel members 242. The rail segments 250 are spaced apart by a distance similar to a spacing between the left rail LR and the right rail RR associated with the railway. These rail segments 250 have ramps at at least one end of each of said rail segments 250, and preferably with first ramps 252 at first ends of rail segment 250 and second ramps 254 at second ends of rail segments 250. These ramps are angled downward from the rail segments 250 in a tapering fashion to a tapering tip.

The ramps 252, 254 and tapering tips thereof preferably extend down from an upper surface of the rail segments 250 a sufficient distance so that when the turntable 210 is assembled and residing between a left rail LR and the right rail RR, the tapering tips of the ramps 252, 254 are either in contact with upper surfaces of the left rail LR and right rail RR, or just above the top surfaces of the left rail LR and right rail RR. While the structural frame 240 is generally rigid, it has sufficient flexibility that it can flex down under weight of the vehicle 10 as a vehicle 10 rides up the ramps 252, 254, so that any gap between the tapered tips of the ramps 252, 254 and upper portions of the left rail LR and right rail RR is reduced or eliminated. The ramps 252, 254 are preferably sufficiently gradual that a user can easily manually push the vehicle 10 until all of the wheels 35 of the vehicle 10 rest upon the rail segments 250.

Figure 20:
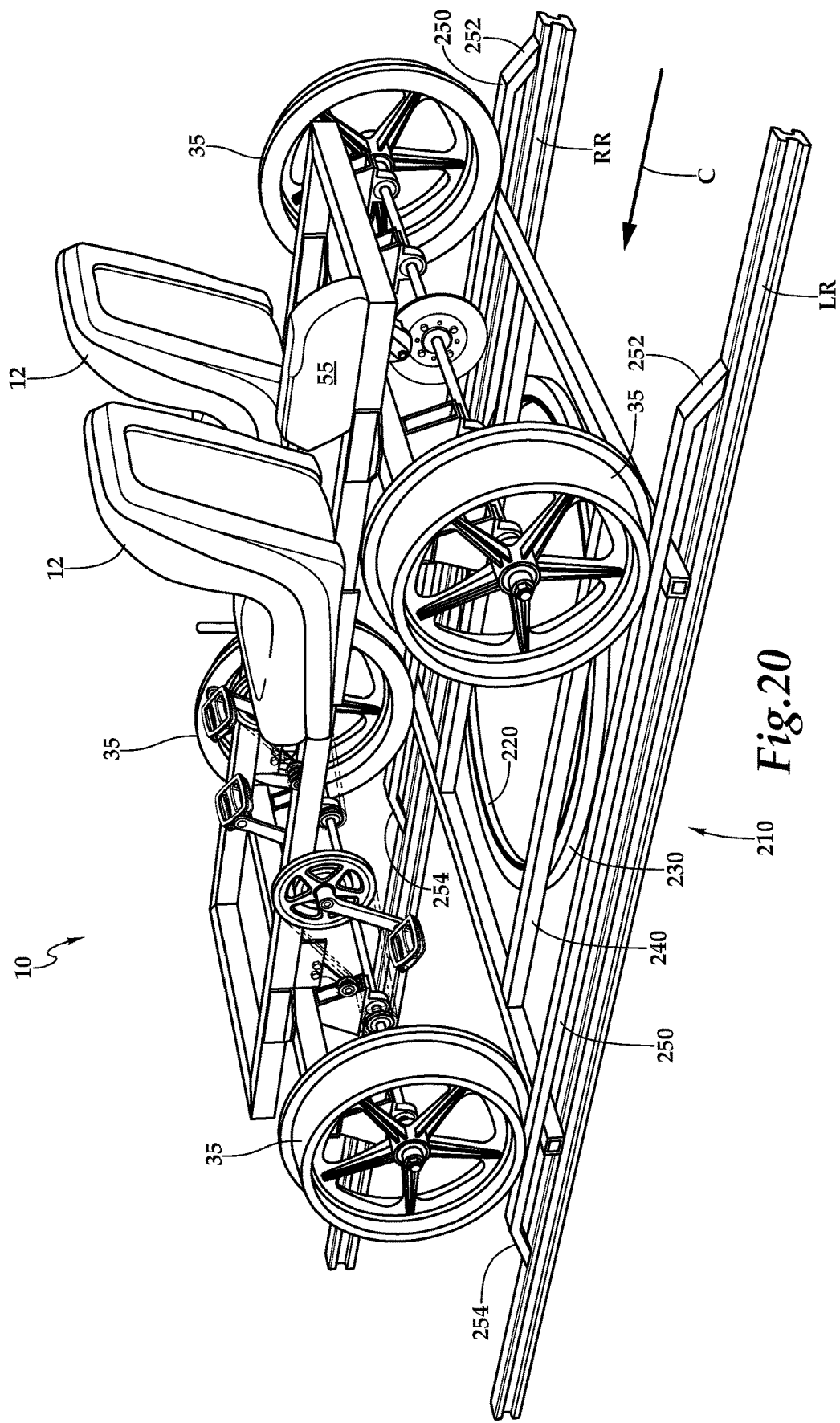
FIG. 20 is a perspective view of a railway vehicle such as that depicted in FIG. 1 shown after it has been moved from the railway up onto rail segments of the turntable, and before re-orientation of the vehicle using the turntable.
Figure 21:
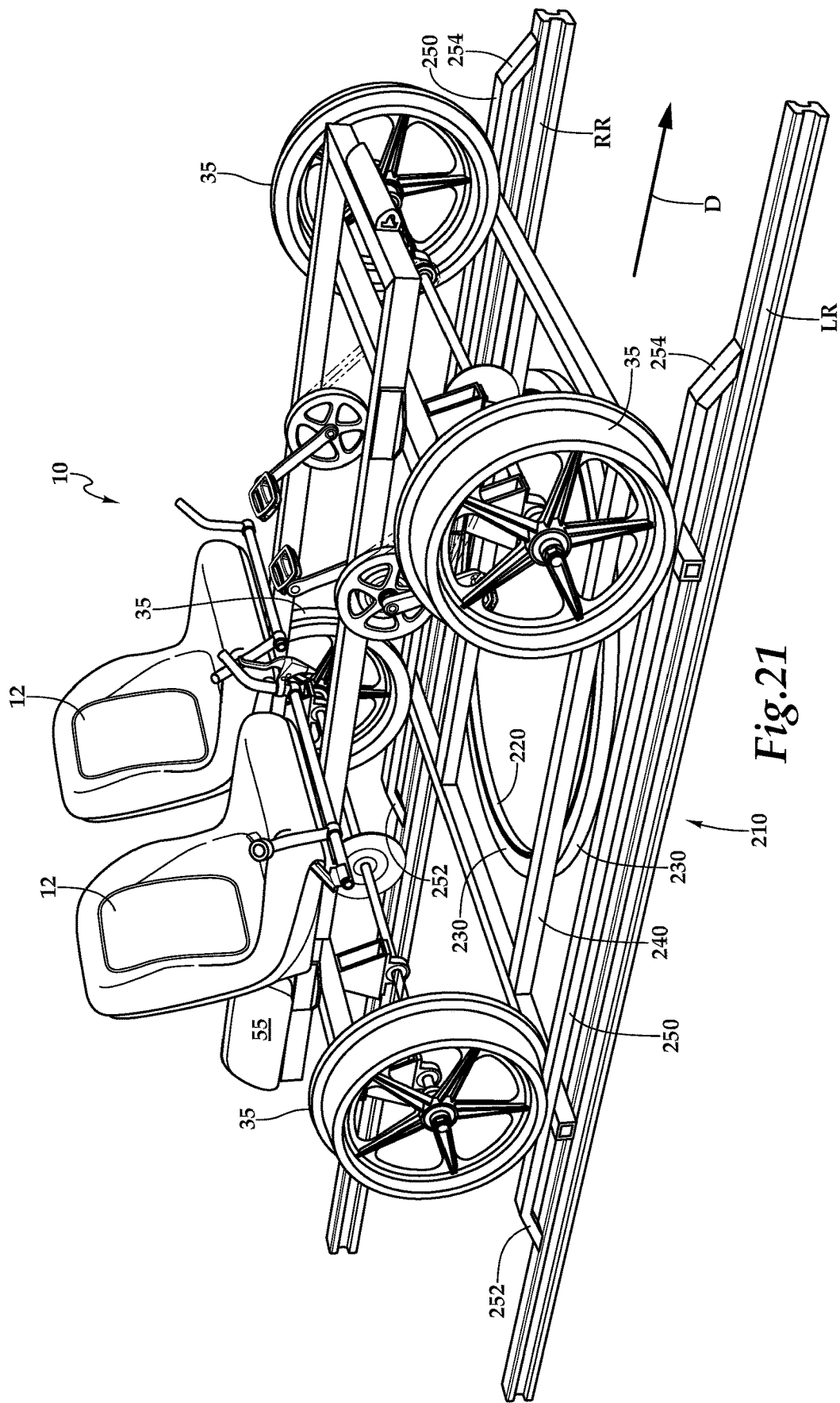
FIG. 21 is a perspective view similar to that which is shown in FIG. 20, but after the vehicle has been re-oriented by rotation of upper portions of the turntable 180°, leaving the vehicle re-oriented to return along the same railway from a destination back to an origin.

When the vehicle 10 is resting upon the rail segments 250 of the turntable 210, upper portions of the turntable 210 can be rotated (along arrow B of FIG. 19) to a new orientation which can align with the same left rail LR and right rail RR, or other rails adjacent to the left rail LR and right rail RR. As shown in FIGS. 20 and 21, a vehicle 10 can be going in a first direction and be driven up onto the turntable 210 (along arrow C of FIG. 20) until the vehicle is entirely upon the turntable 210. The upper portion of the turntable 210 is rotated (along arrow B of FIG. 19) 180°. The vehicle 10 can then be rolled off of the rail segments 250 and back onto the left rail LR and right rail RR (along arrow D of FIG. 21).

Note that it is the same first ramps 252 or the same second ramps 254 which are utilized for both loading of the vehicle 10 onto the turntable 210 and unloading of the vehicle 10 off of the turntable 210. Thus, it is conceivable that only one ramp 252 could be provided on one end of each of the rail segments 250 and still function minimally according to this invention. With two ramps including the first ramps 252 and second ramps 254, a single vehicle can be rolled onto the rail segments 250, re-oriented, and then rolled off of the rail segments 250 in either direction.

When a convoy of vehicles 10 is to be re-oriented upon a railway, a lead vehicle 10 would be rolled up onto the turntable 210, re-oriented, and then rolled off of the turntable 210 in a direction moving away from other vehicles 10 in the convoy. A next vehicle 10 in the convoy would then be moved up onto the turntable 210, re-oriented, and moved off of the turntable 210 toward the lead vehicle 10. A next vehicle 10 in the convoy would then be re-oriented in a similar fashion. Finally, a caboose vehicle 10 would be brought up onto the turntable to 10 and re-oriented and moved off of the turntable 210 (in either direction), so that a vehicle 10 which was originally a lead vehicle in the convoy is now a caboose vehicle of the convoy. A caboose vehicle of the original convoy would then become a lead vehicle 10 of the convoy. The convoy is now ready to return from a destination to an origin along the same railway.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When embodiments are referred to as "exemplary" or "preferred" this term is meant to indicate one example of the invention, and does not exclude other possible embodiments. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A pedal powered railway vehicle, comprising combination:
   four railway wheels, each of said wheels paired with another railway wheel and joined to an end of an axle;
   a frame rotatably supporting said axles with said wheels spaced apart by a distance similar to rails of a railway of a gauge upon which the vehicle is to be carried;
   at least one seat carried upon said frame;
   at least one set of pedals adjacent to said seat and positioned to be accessible by feet of a rider sitting upon said seat;
   a drive between said set of pedals and at least one wheel of the vehicle;
   wherein an electric motor is coupled to at least one wheel of the vehicle, at least indirectly, said electric motor coupled to a battery for supplying electric power to the electric motor, to cause at least one wheel of the vehicle to be driven by electric power;
   wherein said electric motor is configured to supply electric power to at least one wheel of the vehicle when at least one set of pedals is cranked, such that pedaling action by a user automatically causes at least some electric motor assist power to be supplied to the vehicle, in addition to power supplied by the user by pedaling action;
   wherein said vehicle includes a throttle control coupled to said electric motor, said throttle control manually adjustable by a user adjacent to one of said seats, with manual adjustment of said throttle adjusting electric power delivered from said electric motor to the vehicle, such that a user can adjust an amount of electric power supplied to the vehicle, such as for control of speed of the vehicle;
   wherein said electric motor assist power is always supplied to the vehicle when said at least one set of pedals is cranked in addition to said electric power supplied to the vehicle responsive to said throttle control manually adjustable by the user; and
   wherein said electric motor has at least two power settings including a first setting that is lower than a second power setting, said vehicle including a power setting control which is manually adjustable between said at least two power settings, said at least two power settings differing in an amount of power delivered from said electric motor to said at least one wheel when said at least one set of pedals is cranked, with said second setting causing more power to be delivered from said electric motor to said at least one wheel than said first power setting.

2. The vehicle of claim 1 wherein a pair of drivers are provided, coupled to separate sets of pedals adjacent to separate seats, for tandem pedal powering of the vehicle.

3. The vehicle of claim 1 wherein said drive is coupled to at least one of said axles and drives both of said wheels which are joined to said axle driven by said drive.

4. The vehicle of claim 3 wherein said electric motor powers at least one of said drives along with at least one of said sets of pedals for powering of said axle and said wheels joined to said axle, by either cranking of said pedals, power from said electric motor or both cranking of said pedals and power from said electric motor together.

5. The vehicle of claim 4 wherein said drive between said pedals and said axle includes a chain between an output sprocket located closer to said pedals then to said axle and an input sprocket located closer to said axle then to said pedals.

6. The vehicle of claim 5 wherein said output sprocket is coupled to both said set of pedals and said electric motor, such that said output sprocket can drive said chain with power from either said pedals, said electric motor or both said pedals and said electric motor.

7. The vehicle of claim 1 wherein said frame includes a pair of parallel long members extending substantially perpendicular to said axles and with one of said seats coupled to each of said long members, and with a forward member of said frame affixed to said pair of parallel long members, said forward member oriented perpendicular to each of said parallel long members, with a front one of said axles rotatably supported through bearings to said forward member, and with a rearward member of said frame fixed to said pair of parallel long members, said rearward member oriented perpendicular to each of said parallel long members, with a rear one of said axles rotatably supported through bearings to said rearward member.

8. The vehicle of claim 7 wherein a hitch is mounted to said frame on a rear portion of said vehicle, and wherein a linkage is flexibly and removably coupled to said hitch at a distal portion of said linkage, said linkage having a proximal portion coupled to a frame of a trailer, said trailer frame having at least one trailer axle rotatably supported relative to said frame, with said at least one trailer axle including railway wheels at ends of said trailer axle, the wheels spaced a similar distance apart as the rails upon which the vehicle is configured to roll.

9. A method for operating a plurality of pedal powered railway vehicles upon a railway, including the steps of:
   providing a convoy of multiple similar pedal powered railway vehicles upon rails of a railway, each vehicle including four wheels provided in pairs joined by axles and spaced apart by a distance similar to the rails, and with at least one seat and at least one set of pedals adjacent to the seat and with a drive extending from the pedals to at least one wheel of the vehicle for driving of the wheel, at least indirectly, through cranking of the pedals;
   orienting the vehicles in a common direction;
   having separate riders of separate strength levels on the vehicles pedal their vehicles to cause movement of the vehicles in a common direction to a common destination;
   configuring the vehicles to include electric motors configured to drive the vehicles in addition to pedal powered drive;

powering the vehicles at least partially with the electric motors to keep the convoy of pedal powered vehicles closer together than they would be if the multiple vehicles were powered by different individuals pedaling alone;

wherein said providing step includes a hitch mounted to the frame on a rear portion of the vehicle, and wherein a linkage is flexibly and removably coupled to the hitch at a distal portion of the linkage, the linkage having a proximal portion coupled to a frame of a trailer, the trailer frame having at least one trailer axle rotatably supported relative to the frame, with the at least one trailer axle including railway wheels at ends of the trailer axle, the wheels spaced a similar distance apart as the rails upon which the vehicle is configured to roll;

wherein said providing step includes the electric motor of at least one of the vehicles in the convoy configured to supply electric power to at least one wheel of the vehicle when at least one set of pedals is cranked, such that pedaling action by a user automatically causes at least some electric motor assist power to be supplied to the vehicle, in addition to power supplied by the user by pedaling action;

wherein the vehicle includes a throttle control coupled to the electric motor, the throttle control manually adjustable by a user adjacent to one of the seats, with manual adjustment of the throttle adjusting electric power delivered from the electric motor to the vehicle, such that a user can adjust an amount of electric power supplied to the vehicle, such as for control of speed of the vehicle;

wherein the electric motor assist power is always supplied to the vehicle when the at least one set of pedals is cranked in addition to the electric power supplied to the vehicle responsive to the throttle control manually adjustable by the user; and wherein the electric motor has at least two power settings including a first setting that is lower than a second power setting, the vehicle including a power setting control which is manually adjustable between the at least two power settings, the at least two power settings differing in an amount of power delivered from the electric motor to the at least one wheel when the at least one set of pedals is cranked, with the second setting causing more power to be delivered from the electric motor to the at least one wheel than the first power setting.

10. The method of claim 9 including the further step of providing a lead car vehicle with an authorized individual thereon, and with a caboose car vehicle at a rear of the convoy, and with radio communication between an authorized individual on the lead car and an authorized individual on the caboose, for communication between a front and rear of the convoy.

11. The method of claim 9 wherein said providing step includes the electric motor powering at least one of the drives along with at least one of the sets of pedals for powering of the axle and the wheels joined to the axle by either cranking of the pedals, power from the electric motor or both cranking of the pedals and power from the electric motor:

wherein said providing step includes the drive between the pedals and the axle having a chain between an output sprocket located closer to the pedals than to the axle and an input sprocket located closer to the axle than to the pedals;

wherein said providing step includes the output sprocket coupled to both the set of pedals and the electric motor, such that the output sprocket can drive the chain with power from either the pedals, the electric motor or both the pedals and the electric motor; and wherein said providing step includes the frame having a pair of parallel long members extending substantially perpendicular to the axles and with one of the separate seats coupled to each of the long members, and with a forward member of the frame affixed to the pair of parallel long members, the forward member oriented perpendicular to each of the parallel long members, with a front one of the axles rotatably supported through bearings to the forward member, and with a rearward member of the frame fixed to the pair of parallel long members, the rearward member oriented perpendicular to each of the parallel long members, with a rear one of the axles rotatably supported through bearings to the rearward member.

* * * * *